(12) United States Patent
Alexander et al.

(10) Patent No.: US 8,572,622 B2
(45) Date of Patent: *Oct. 29, 2013

(54) REDUCING QUEUE SYNCHRONIZATION OF MULTIPLE WORK ITEMS IN A SYSTEM WITH HIGH MEMORY LATENCY BETWEEN PROCESSING NODES

(75) Inventors: Benjamin G. Alexander, Austin, TX (US); Gregory H. Bellows, Austin, TX (US); Joaquin Madruga, Austin, TX (US); Barry L. Minor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 941 days.

This patent is subject to a terminal disclaimer.

(21) Appl. No.: 12/649,675

(22) Filed: Dec. 30, 2009

(65) Prior Publication Data

US 2011/0161976 A1  Jun. 30, 2011

(51) Int. Cl.
 *G06F 9/46* (2006.01)
(52) U.S. Cl.
 USPC ......................................................... 718/104
(58) Field of Classification Search
 None
 See application file for complete search history.

(56) References Cited

U.S. PATENT DOCUMENTS

| | | | |
|---|---|---|---|
| 6,779,182 B1 * | 8/2004 | Zolnowsky | 718/103 |
| 2005/0262509 A1 * | 11/2005 | Kelly | 718/104 |
| 2010/0100883 A1 * | 4/2010 | Booton | 718/103 |

* cited by examiner

*Primary Examiner* — Gregory A Kessler
(74) *Attorney, Agent, or Firm* — Yudell Isidore Ng Russell PLLC

(57) ABSTRACT

A system efficiently dispatches/completes a work element within a multi-node, data processing system that has a global command queue (GCQ) and at least one high latency node. The system comprises: at the high latency processor node, work scheduling logic establishing a local command/work queue (LCQ) in which multiple work items for execution by local processing units can be staged prior to execution; a first local processing unit retrieving via a work request a larger chunk size of work than can be completed in a normal work completion/execution cycle by the local processing unit; storing the larger chunk size of work retrieved in a local command/work queue (LCQ); enabling the first local processing unit to locally schedule and complete portions of the work stored within the LCQ; and transmitting a next work request to the GCQ only when all the work within the LCQ has been dispatched by the local processing units.

13 Claims, 17 Drawing Sheets

| GLOBAL/COMMON CMD QUEUE 320 | | | | |
|---|---|---|---|---|
| ND RANGE WORK ELEMENTS 325 | SEEN CNTR 627 | WIR CNTR 629 | MASK BITS 330 | ATTR 631 |
| WE_R | NCU | NWI | nnnNNN | A1..AN |
| ... | ... | ... | ... | ... |
| WE_2 | 48 | 2000 | 0011010111 | A1..AN |
| WE_1 | 7 | 100 | 1011010111 | A1..AN |
| WE_0 | 4 | 16 | 1001010100 | A1..AN |

*FIG. 6A*

| GLOBAL/COMMON CMD QUEUE 320 | | | | |
|---|---|---|---|---|
| ND RANGE WORK ELEMENTS 325 | SEEN CNTR 627 | WIR CNTR 629 | MASK BITS 330 | ATTR 331 |
| WE_R | NCU | NWI | nnnNNN | A1..AN |
| ... | ... | ... | ... | ... |
| WE_2 | 48 | 2000 | 0011010111 | A1..AN |
| WE_1 | 7 | 100 | 1011010111 | A1..AN |
| WE_0 | 4 | 12 | 1001010100 | A1..AN |

*FIG. 6B*

| GLOBAL/COMMON CMD QUEUE 320 | | | | |
|---|---|---|---|---|
| ND RANGE WORK ELEMENTS 325 | SEEN CNTR 627 | WIR CNTR 629 | MASK BITS 330 | ATTR 631 |
| WE_R | NCU | NWI | nnnNNN | A1..AN |
| ... | ... | ... | ... | ... |
| WE_2 | 48 | 2000 | 0011010111 | A1..AN |
| WE_1 | 7 | 100 | 1011010111 | A1..AN |
| WE_0 | 3 | 0 | 1001010100 | A1..AN |

*FIG. 6C*

| GLOBAL/COMMON CMD QUEUE 320 | | | | |
|---|---|---|---|---|
| ND RANGE WORK ELEMENTS 325 | SEEN CNTR 627 | WIR CNTR 629 | MASK BITS 330 | ATTR 631 |
| WE_R | NCU | NWI | nnnNNN | A1..AN |
| ... | ... | ... | ... | ... |
| WE_2 | 48 | 2000 | 0011010111 | A1..AN |
| WE_1 | 7 | 90 | 1011010111 | A1..AN |
| WE_0 | 1 | 0 | 1001010100 | A1..AN |

*FIG. 6D*

| GLOBAL/COMMON CMD QUEUE 220 ||||| 
|---|---|---|---|---|
| ND RANGE WORK ELEMENTS 325 | SEEN CNTR 627 | WIR CNTR 629 | MASK BITS 330 | ATTR 631 |
| WE_R | NCU | NWI | nnnNNN | A1..AN |
| ⋮ | ⋮ | ⋮ | ⋮ | ⋮ |
| WE_2 | 48 | 2000 | 0011010111 | A1..AN |
| WE_1 | 6 | 90 | 1011010111 | A1..AN |
| WE_0 | 3 | 0 | 1001010100 | A1..AN |

*FIG. 6E*

| GLOBAL/COMMON CMD QUEUE 220 ||||| 
|---|---|---|---|---|
| ND RANGE WORK ELEMENTS 325 | SEEN CNTR 627 | WIR CNTR 629 | MASK BITS 330 | ATTR 631 |
| WE_R | NCU | NWI | nnnNNN | A1..AN |
| ⋮ | ⋮ | ⋮ | ⋮ | ⋮ |
| WE_2 | 48 | 2000 | 0011010111 | A1..AN |
| WE_1 | 4 | 50 | 1011010111 | A1..AN |
| WE_0 | 1 | 0 | 1001010100 | A1..AN |

*FIG. 6F*

REDUCING QUEUE SYNCHRONIZATION OF MULTIPLE WORK ITEMS IN A SYSTEM WITH HIGH MEMORY LATENCY BETWEEN PROCESSING NODES

BACKGROUND

1. Technical Field

The present invention generally relates to multi-processor data processing systems and in particular to operations on data processing systems configured with multiple independent processing nodes. Still more particularly, the present invention relates to a method and system for completing parallel processing of work items of a single work set distributed across multiple processing units of a multi-node data processing system.

2. Description of the Related Art

Multi-core data processing systems are widely utilized to enable parallel processing of data that can be divided into portions for completion. There are various different topologies of multi-core systems of which non-uniform memory access (NUMA) system topology is one example. To support process scheduling or work scheduling on distributed processing systems such as the NUMA system, separate queues are provided for each processing node because it is assumed that latency (e.g., communication latency, data transfer latency, etc.) between each node is too large or great, according to some metric, to share a common queue for scheduling work. For example, a memory bus (such as a POWER5™ (P5) bus) may operate at a data transfer rate which provides data transfer latency that is too large or great for multiple nodes to share a common queue. Thus, with these types of multi-node processing systems, work processes and associated data must be divided among the separate work queues ahead of work dispatch and execution. Once the execution of work begins in the different processing nodes, a work stealing system/algorithm is then utilized to rebalance the workload in the separate queues. Implementation of these work stealing algorithms injects a large amount of complexity into the scheduler. This complexity can often lead to inefficient run scenarios where work is continuously "balanced" or "re-balanced" between or among two or more nodes.

SUMMARY

Disclosed are a multi-node, computer system architecture for efficient dispatch/completion of a work element within a multi-node data processing system having at least one processor node that exhibits high access latency to a global command queue (GCQ). The implementation comprises: at the at least one high latency processor node, work scheduling logic establishing a local command/work queue (LCQ) in which multiple work items for execution by local processing units can be staged prior to execution; a first local processing unit: generating a work request for retrieval of work from the GCQ; retrieving via the work request a larger chunk size of work than can be completed in a normal work completion/execution cycle by the local processing unit, wherein the larger chunk size is larger than a standard chunk size that is retrieved when the processing node is a low latency processing node; storing the larger chunk size of work retrieved in a local command/work queue (LCQ); enabling the first local processing unit to locally schedule and complete portions of the work stored within the LCQ; and generating a next work request and transmitting the next work request to the GCQ only when all the work within the LCQ has been dispatched by at least the first local processing unit.

The above summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The claimed subject matter and equivalents thereof will best be understood by reference to the following detailed description of illustrative embodiments when read in conjunction with the accompanying figures, wherein:

FIGS. 6A-6F provides a sequence of block diagrams representing an example global command queue with APU mask and illustrating modifications to count variables within the global command queue as work items are retrieved from a work element for processing by one or more pre-selected processor cores, in accordance with one embodiment;

DETAILED DESCRIPTION

Figure 1:
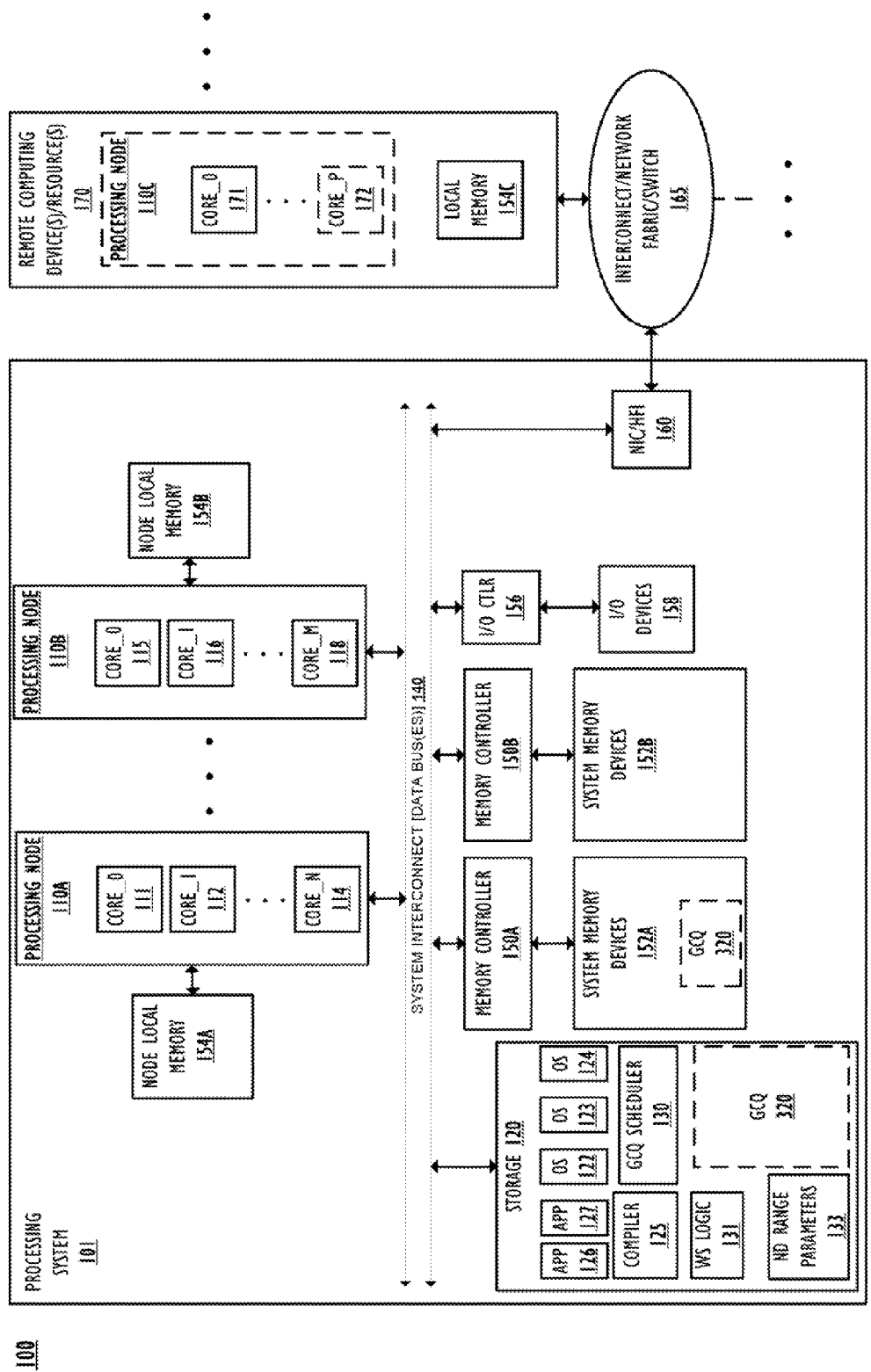
FIG. 1 illustrates an example multi-node, distributed data processing system architecture with multiple nodes each having multiple processor cores and local memory, within which features of one or more of the described embodiments may be implemented.

The illustrative embodiments provide a method and a multi-node, multi-core processing system for efficient dispatch/completion of a work element within a multi-node data processing system having at least one processor node that exhibits high access latency to a global command queue (GCQ). The method implementation comprises: work scheduling logic at the high-latency processor node establishing a local command/work queue (LCQ) in which multiple work items for execution by local processing units can be staged prior to execution; a first local processing unit retrieving via a work request a larger chunk size of work than can be completed in a normal work completion/execution cycle by the local processing unit; storing the larger chunk size of work retrieved in a local command/work queue (LCQ); enabling the first local processing unit to locally schedule and complete portions of the work stored within the LCQ; and transmitting a next work request to the GCQ only when all the work within the LCQ has been dispatched by the local processing units.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIGS. 1 and 2xx for FIG. 2). The specific numerals assigned to the elements are provided solely to aid in the description and not meant to imply any limitations (structural or functional) on the invention.

It is understood that the use of specific component, device and/or parameter names is for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. Specifically, the following terms, which are utilized herein, are defined as follows:

(1) Approved Processing Units (APU): processor cores that have a bit mask represented (i.e., set to 1) in a global bit mask (APU mask) linked to a specific work element within the global command queue (GCQ). The APUs are the processor cores among all processor cores in the overall system that are allowed to process work from a particular work set within the global command queue.

(2) Kernel/Work Element: a combination of a function to be executed and the number of times to execute the function over a particular set of input data. Each execution of the function on a unique data is referred to herein as a "work item", and each work element is assumed to comprise multiple work items which can be executed across multiple different processing nodes by multiple different processing units.

(3) Work Item: a base element of a data set (e.g., a byte, a string, an integer number, an floating point number, a pixel, an array, a data structure, etc.).

(4) Work Group: a group of work items, which group is referred to herein as a "work element" when placed in a single entry of a global command queue.

(5) ND Range Size: a number of work items in an index space.

(6) Work Group Size: a number of work items in a work group, where the number divides into a ND Range Size without a remainder.

(7) Kernel: a function that processes a work item to produce a result, where the function is implemented by one or more instructions executable by a processor core.

(8) Kernel Object: a kernel and argument(s) to use when executing the kernel.

(9) Work Item Remaining (WIR) Counter: a counter that tracks the number of work items within a work element and which is decremented each time one or more work items are removed by a processor core. The amount of the decrement is equal to the number of work items removed by the processor core, and the counter is decremented until the counter value reaches or goes below zero.

(10) Seen Counter: a counter which tracks the number of approved processing units that have seen/queried the work element for work. The seen counter is initially set to the total number of APUs that are assigned to the work element, and the counter is subsequently decremented each time a different one of the APUs checks the work element for work while the WIR Counter value is at or below zero. A work element is removed from the GCQ whenever the Seen Counter reaches zero.

In the following descriptions, headings or section labels are provided to separate functional descriptions of portions of the invention provided in specific sections. These headings are provided to enable better flow in the presentation of the illustrative embodiments, and are not meant to imply any limitation on the invention or with respect to any of the general functions described within a particular section. Material presented in any one section may be applicable to a next section and vice versa.

A. System Architecture

As provided herein, the invention is applicable to any number of different configurations of such multi-core systems, including ones configured as large-scale parallel processing system, or ones configured as non-uniform memory access (NUMA) processing system, or other type of multi-core processing system, including parallel processing systems. The descriptions provided herein assume no specific architecture, other than a multi-core architecture. However, certain features are assumed implemented in multi-node architectures (i.e., system with multiple processing nodes) in which one or more processing nodes exhibit low latency when accessing a global/shared memory structure, while other features are assumed to be implemented in multi-node architectures in which one or more processing nodes exhibit high-latency when accessing the global/shared memory structure.

As further described below, implementation of the functional features of the invention is provided within processing nodes and involves use of a combination of hardware, firmware, as well as several software-level constructs. The presented figures illustrate both hardware and software components within an example distributed, multi-node computing environment in which multiple physically separate processing nodes, interconnected via a general system interconnect and/or a network interface device (NID) and/or host fabric interface (HFI) and/or one or more other forms of interconnects (e.g., switches, and the like), provide a distributed data processing system that executes one or more ND work sets via a plurality of processor cores. The illustrative and described embodiments assume that the system architecture may be scaled to a much larger number of processing nodes.

Turning now to the figures, and in particular to FIG. 1, which illustrates an example multi-node, distributed Data Processing System (DPS) architecture within which the described embodiments may be advantageously implemented. As shown, DPS architecture 100 comprises a local processing system 101, which is coupled to a remove computing device 170 via an interconnect 165, such as a network fabric or switch. Local processing node 101 comprises a plurality of processing nodes of which processing node0 110A and processing nodeN 110B are illustrated. Processing node0 110A and processing nodeN 110B are coupled to system interconnect 140, which serves as and may interchangeably be referred to as data buses.

System interconnect 140 provides connectivity within processing system 101 to various devices, including but not limited to, memory controllers 150A, 150B and input/output (I/O) controller 156. Network controllers 150A, 150B controls access to respective system memory devices 152A, 152B. Depending on system design, memory controllers 150A, 150B may be assigned to respective processing nodes 110A or 110B, and/or may be physically located on the processor chip or at some other location within the overall system architecture. It is appreciated that the presence of multiple memory controllers 150A, 150B is a design parameter, and that the local processing system 101 may be configured with a single memory controller in an alternate embodiment. In one embodiment, I/O controller 156 provides control over/by one or more I/O devices 158, such as a pointing device, display monitor, and the like.

In addition to system memory devices 152A, 152B of the overall system, each processing node 110A and 110B has an associated node local memory 154A, 154B, which allows for staging of work at the processing node without requiring the processing node to have to retrieve each piece of work individually from the system memory 152A, 152B or other remote (or high latency) location. Each processing node 110A, 110B has a plurality of processor cores, although it is possible for the nodes to be single core nodes. As shown, processor node 110A comprises N+1 cores, numbered core_0 though core_N, where N is an integer greater than zero. Likewise, processor node 110B comprises M+1 cores, numbered core_0 though core_M, where M is an integer greater than zero. So as to simplify the description of the embodiments, both N and M are assumed to be integer three (3), such that processing node 110A has four (4) processor cores 111-114 and processing node 110B has four (4) processor cores 115-119. Where utilized herein, the term processing units are assumed to be synonymous with processor cores.

The use of the integer variables "N" and "M" to cap the number of processor cores in respective processing nodes 110A and 110B merely indicates that each processing node can include a variable number of separate processor cores, with N and M being integers of any size greater than 0 (assuming a multi-core implementation for respective processing nodes). The number of processing nodes deployed in a given system architecture is implementation-dependent and can vary widely. It is appreciated that the embodiments described herein enables scaling to a much larger number of processing nodes and even larger number of processor cores. Within the described embodiments, local processing system 101 is assumed to be the source of the ND Range work set that is generated and processed by the processor cores within DPS architecture 100.

As further illustrated, local processing system 101 also includes storage 120, within which are stored several of the firmware and software components that enable generation of work and ND Range work sets for execution by one or more of the processing units. Provided within storage 120 are several operating systems (OSes) 122-124, applications 126-127, compiler 125, GCQ scheduler 130, ND Range Work Scheduling (WS) logic 131, and ND range parameters 133 (which may also be stored in system memory 152). In one embodiment, GCQ scheduler 130 is logic that is executed by a processing unit to receive work kernels from a compiler and schedule the work for dispatch to/by one or more of the multiple processor cores within the DPS architecture 100. In one embodiment, the work set that is operated on is retrieved by compiler 125 from one or more of applications 125-126 and/or OSes 122-124, or from some other source (not illustrated herein). Further, local processing system 101 includes global command queue (GCQ) 320, which may be stored in storage 120 or within system memory 152A. Local storage of GCQ 320 enables low latency access to GCQ by processor cores, such as cores 0-N and 0-M, when these processor cores are looking for work to complete. In one embodiment, compiler 125 includes a just in time (JIT) compiler that produces one or more kernels in accordance with a method or process associated with processing work. For example, application 126 can implement a method or process associated with processing work, and in response to an execution of application 126, the JIT compiler can produce one or more kernels to process a data set or work. While generally illustrated as software implemented components, the functionality of the GCQ logic, WS logic, compiler, and other functional logic generally described herein (e.g., LCQ logic) may be implemented as hardware or a combination of hardware and software, in some embodiments.

Local processing system 101 includes or is coupled to a switch or other global interconnect (e.g., interconnect 165) to which multiple other processing nodes may be connected. As illustrated, local processing system 101 is communicatively connected to remote computing device 170 via interconnect 165, which may be a network fabric or switch. Connection to interconnect 165 is provided via network interface controller (NIC) 160, which may be a host fabric interface (HFI). Interconnect 165 may be a single general interconnect to which all nodes connect or may comprise one or more subnets (not shown) connecting a subset of processing nodes to each other and/or to local processing system 101, in one of several alternate configurations.

Remote computing device 170 provides additional computing resources within DPS architecture 100, such as remote processing node 110C and associated local memory 154C. Remote processing node 110C comprises at least one processor core, of which core0 171 is provided. Where processing node 110C is a multi-core processing node, processing node 110C may comprise P+1 cores, of which core_P 172 is illustrated. With this multi-core configuration, "P" is an integer greater than or equal to one. For purposes of describing the illustrative embodiments, P is assumed to be one (1), such that processing node 110C has two (2) processing cores. Also, because of the relative distance between remote computing device 170 and specifically processing node 110C from the work staging area within local processing system 101, core_0 and core_P 172 are described in some embodiments as cores exhibiting high latency during shared work retrieval and/or balancing, as will become clearly in the descriptions which follow.

The illustrated configuration of multi-node DPS architecture multiple processing nodes is presented herein for illustrative purposes only. The functional features of the embodiments described herein therefore apply to different configurations of data processing systems. Those skilled in the art will appreciate that DPS architecture 100 of FIG. 1 can include many additional components, such as interconnect bridges, ports for connection to networks or attached devices, and the like (none of which are illustrated herein). Because such additional components are not necessary for an understanding of the present invention, they are not illustrated in FIG. 1 or discussed further herein.

B. Architecture for Low Latency Work Retrieval by Processing Units

Certain of the features of the described embodiments may lend themselves to N Dimensional (ND) Range processing/execution paradigms, such as provided by OpenCL™ and similarly structured applications executed on multi-core data processing systems in which an execution command contains the information necessary to efficiently execute and balance work load of the command, which may include data or task parallel processing requirements. Each command includes information corresponding to the total number of work groups within the command to be executed. The compiler of the processing system receives the command and generates kernels of work, which are scheduled on one or more of the available processor cores of the processing system. With a conventional multi-node processing system, the scheduling of work items associated with each kernel may be completed as entire work groups, utilizing local node queues as illustrated by FIG. 2.

Figure 2:
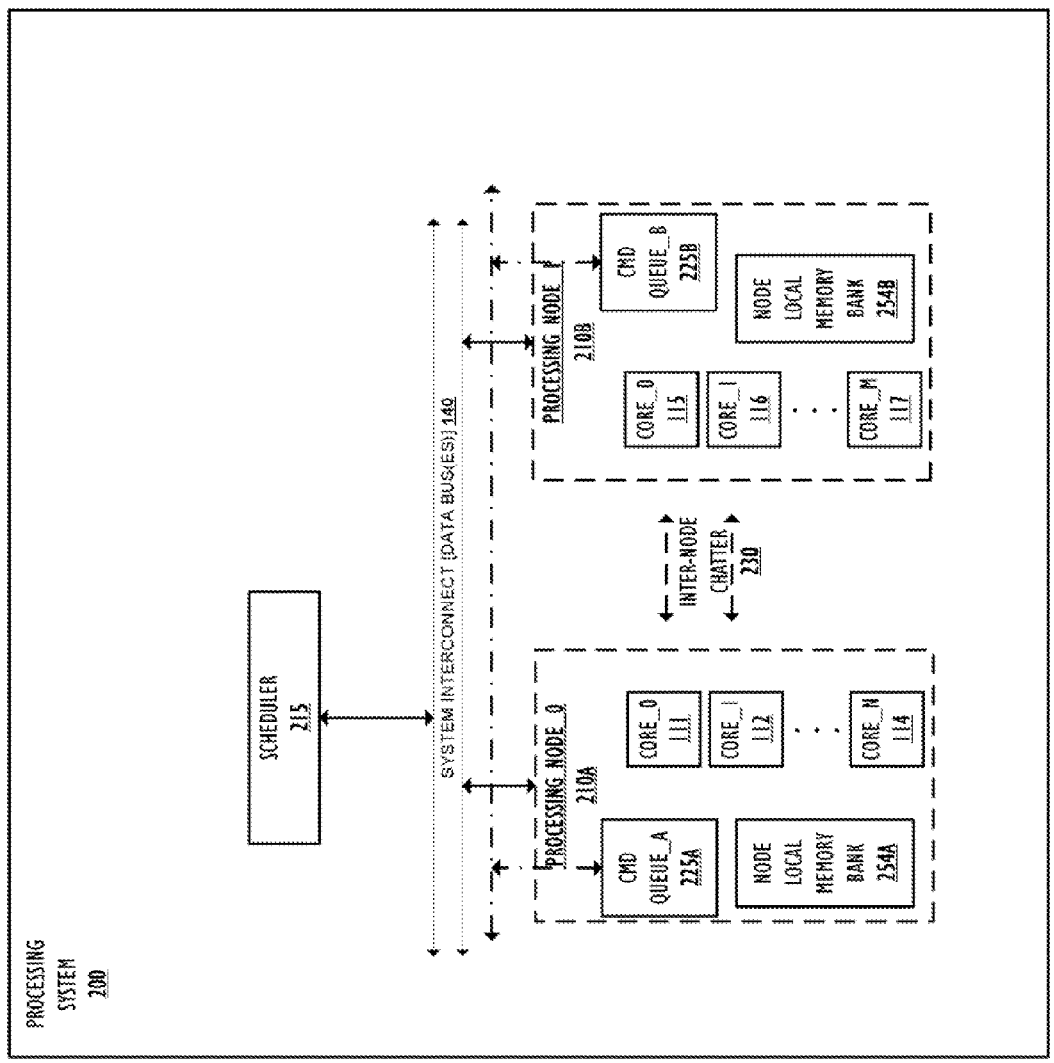
FIG. 2 illustrates a prior art implementation of a non-uniform memory access (NUMA) system with two processing nodes having local work queues of pre-distributed portions of work, which are periodically re-balanced using a work queue re-balancing algorithm.

FIG. 2 thus illustrates a conventional configuration of a multi-node processing system 200 in which work generated by a command is executed by processor cores on different processing nodes 210A, 210B by dividing the data set into work groups and arbitrarily and statically assigning the work groups to separate, structured command queues (i.e., pre-set sized queues) that are physically located within each node. As shown, processing node 210A includes command queue 225A, while processing node 210B includes command queue 225B. Scheduler 215 assigns different portions of the entire work, perhaps based on memory affinity of the addressing scheme of node local memory 254A, 254B relative to the data elements within the work, without full consideration for load balancing across the nodes. To complete the dispatch of work and account for dependencies, etc. the nodes have to communicate with each other and may have to move work around the different command queues. There is considerable amount of cross chatter between the nodes to provide coordination with each other as the work is being performed out of their respective local command queues. This configuration leads to work contention over the system interconnect 140 as the processing cores operate at different speeds and often have to rebalance the work load amongst the nodes, leading to substantial amounts of inter-node chatter 230 as the nodes attempt to move work around between the different work queues (225A, 225B).

Figure 3:
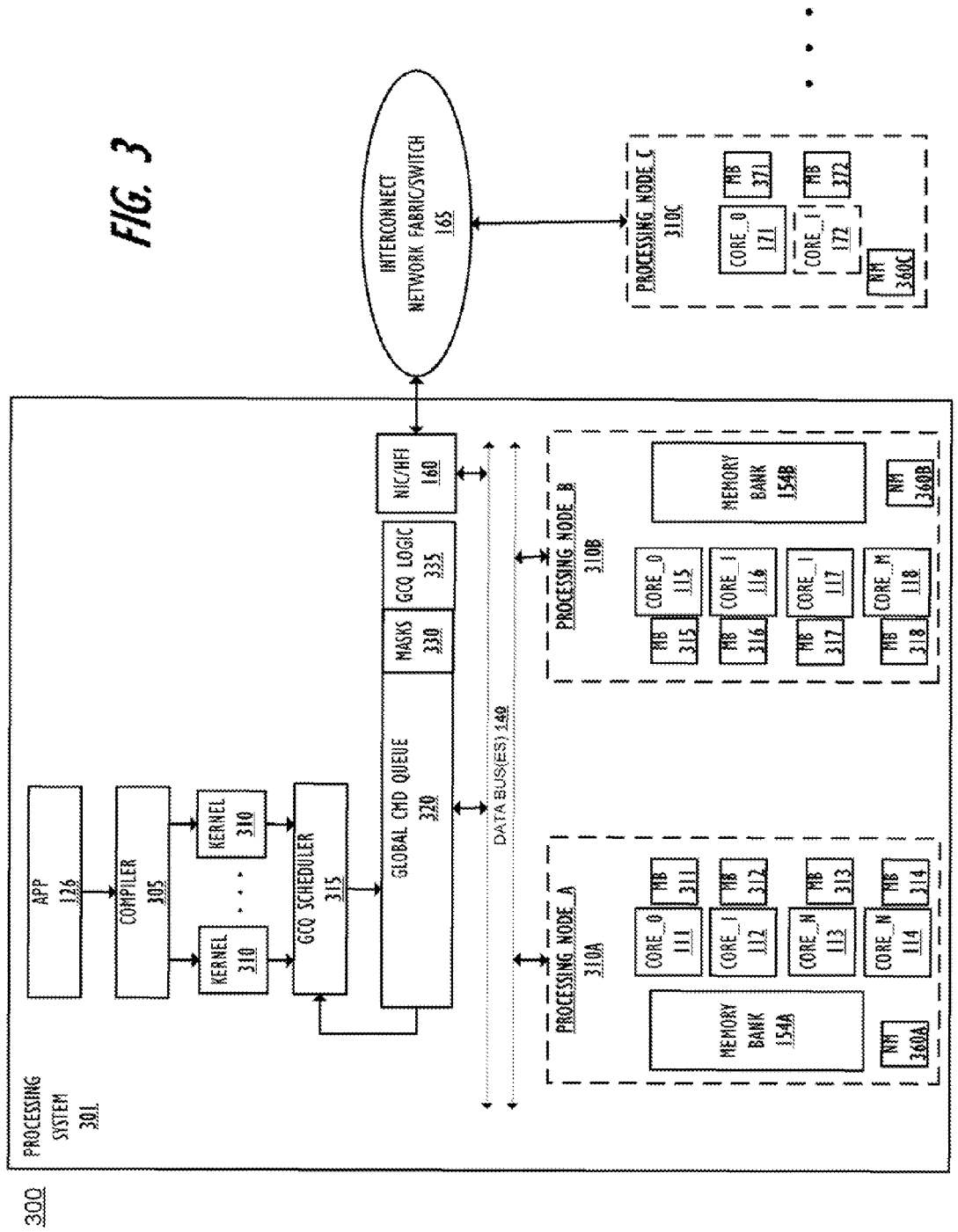
FIG. 3 illustrates a first example of a multi-core, multi-node processing system configured with a shared global command queue (GCQ) having an Allocated Processing Units (APU) mask associated with each work entry and processing unit (PU) masks associated with each processor core to enable selective retrieval of work by approved processor cores within the system, in accordance with one embodiment.

With reference now to FIG. 3, there is provided one embodiment of a multi-node processing system architecture 300, which includes software and hardware constructs to allow for effective and efficient work allocation to and completion by processing nodes and specifically processor cores (on these processing nodes) when the processor cores exhibit low latency communication with system memory of local processing system 300 on which the work is being dispatched. In addition to the hardware structure presented in system architecture (100) of FIG. 1, which have been previously described, FIG. 3 provides a different configuration and functionality of several of the software and firmware components introduced in FIG. 1 as well as two new constructs, which together enable the functional features of the described embodiments.

Multi-node processing system architecture 300 is illustrated with three processing nodes, processing node A 310A and processing node B 310B, each having four (4) processor cores (nodeA cores 111-114 and nodeB cores 115-118) and processing node C, with two processor cores (nodeC cores 171-172). Each processing core within system architecture 300 (namely processing cores 111-114, processing cores 115-118, and processing cores 171-172) is provided a unique bit mask identifier (MB), which is associated/linked/encoded with each processor core and uniquely identifies the specific processor core from other processor cores within the overall system architecture 300. Thus, for example, core0 111 is tagged with first bit mask (MB) 311, core1 112 is tagged with second bit mask 312, coreN 114 is tagged with fourth bit mask 314, core2 116 is tagged with sixth bit mask 316, and so on. For simplicity, the bit masks are referred to herein as processing unit (PU) mask, such that each processing unit/processor core has a unique mask identifier. Example PU masks as well as their functionality are provided in FIG. 4, which is described below. In one embodiment, each processor node (310A, 310B, 310C) is also provide a node-level bit mask, nodeA mask (NM) 360A, nodeB mask 360B, and nodeC mask 360C to enable node level scheduling, as described further below.

Turning now to the functional blocks in the upper portion of the figure, the executable/execution code of example application 126 is forwarded to compiler 305, which processes the instructions/codes to generate commands. These commands provide work divided into work groups, each referred to as kernel 310. The kernels 310 are forwarded to GCQ scheduler 315. GCQ scheduler 315 is an enhanced runtime scheduler that dynamically performs the functions of: (1) scheduling (placing) work elements into a global command queue (GCQ) 320; (2) selective allocating/assigning the work elements to specific selected processor nodes or processing units (cores) from among the entire set of available processor nodes or processing units; generating an APU mask (330) corresponding to the specific selected processor cores allocated/assigned the work element; and appending/linking or otherwise associating the APU mask (330) to the work element by forwarding the APU mask to GCQ 320. The above scheduler functions are performed at runtime, and the work items associated with the command are generated at runtime when the work element is placed in GCQ 320 for dispatch. In one embodiment, the selectively allocating of the work elements to selected processor cores involves and/or is based on a scheduling criteria that takes into account workload allocation and work balancing across the system architecture, processing capabilities of the different types of processing units (e.g., CPU, GPU, SPU), and other factors, which may be pre-programmed by the designer of the GCQ scheduler. The actual scheduling of the work elements at the GCQ then involves dispatching work items from the work element in the GCQ to only the selected specific processing nodes or the processing units, wherein the dispatching is responsive to receipt at the GCQ of work requests from each of the multiple processing nodes or the processing units, The APU mask 320 represents a global bit mask and is a field of 1s and 0s, with the 1s representing the processing units of the node(s) to which the particular work element may be forwarded, and the 0s indicating that a particular processing unit has not been selected to process work for that work element. The actual size of APU mask 320 scales based on the total number of processing nodes and processor cores available for consideration during allocation of work by GCQ scheduler 315. In implementations where the division of work is per processing nodes, rather than at the granularity of processor cores, the APU mask represents a node mask, which is a bit mask identifying the specific processor node. Any processor core at that selected processing node may then consume the work items from the work element.

In one embodiment, scheduler assigns a different APU mask to each work element; However, it is contemplated that multiple work elements of a single command (work) may be provided with the same APU mask, leading to an alternate embodiment in which a single APU mask may be utilized for multiple sequential work elements placed in the GCQ. An example GCQ 320 is provided by FIGS. 6A-6D, which are described below. GCQ 320 may also comprise GCQ logic 335, which enables selective processor core retrieval of work elements and other aspects of the functionality described hereafter.

It is important to note that the types of work being described herein may be work performed on an N Dimensional (ND) Range of data, which work is passed to the compute nodes, via the GCQ as an ND Range work instruction. In an ND Range instruction, an N dimensional range of work is provided for execution in compute nodes by specific/selected ones of the processor cores, as identified by the APU mask. The value of N in the ND Range and hence the number of dimensions is variable and may be any integer value greater than one (1). According to the described embodiments, the ND Range instructions are executed per kernel invocation, which sets the characteristics of the execution. With the described implementation of GCQ 320, the APU mask 330 and other execution properties (and/or attributes of the work element) are attached to the work items themselves.

FIG. 6A illustrates an example GCQ 320, which comprises multiple queue entries, of which three entries are shown with enqueued work elements, WE_0, WE1, and WE_2. As provided by FIG. 6A, in addition to the actual work element, each entry has a number of variables and/or attributes or properties that are associated with (or linked to) the specific work element, and which are stored in one of the pre-established fields of the GCQ entry. The first row of GCQ indicates the nomenclature provided for each field of each of the GCQ entries. Thus each occupied/filled GCQ entry includes the following fields of information: ND Range work element 625; seen counter 627; work items remaining (WIR) counter 629; APU mask 330; and attributes 631. For purposes of description, the last/bottom entry is the first entry in GCQ 320 and holds work element zero (WE_0) with its associated properties, attributes, and/or variables. As provided by the WIR count within WIR counter 629 of GCQ 320, when WE_0 is initially placed within the GCQ entry, WE_0 includes 16 work items within the work set/group generated by compiler 315 (and enqueued within GCQ) that remain to be executed by the selected processing units. Additionally, as indicated by the seen count within seen counter 627, the 16 work items may be executed by four (4) different selected processing units/cores, which have been identified by scheduler prior to placing the work element in the GCQ. The specific selected processor cores are identified by APU mask 320, which is a sequence of bits that provide an ordered identification of which processor cores of the N processor cores within the overall system have been assigned to process the 16 work items within WE_0.

In the described embodiments, the start value of the seen counter is presented as the number of allocated processing units to/on which work items of the specific work element may be dispatched or scheduled. However, in an alternate embodiment, the seen count is initiated with a start value equal to the total number of processing units within the overall system. For example, with system architecture 300 of FIG. 3, assuming all processing nodes and corresponding processing units have been accounted for, the seen count would be initiated with a value of ten (10). With this alternate embodiment, decrementing of the seen count would be triggered for each processor core that goes to the GCQ for work, regardless of whether the processor core was actually one of the selected processor cores approved for dispatching/scheduling work items from the work element. Either embodiment may be implemented; however, the described embodiments assume the former implementation in which only the approved processor cores are accounted for by the seen count and only those approved processor cores trigger a decrementing by the GCQ logic of the seen count for the particular work element.

Figure 4:
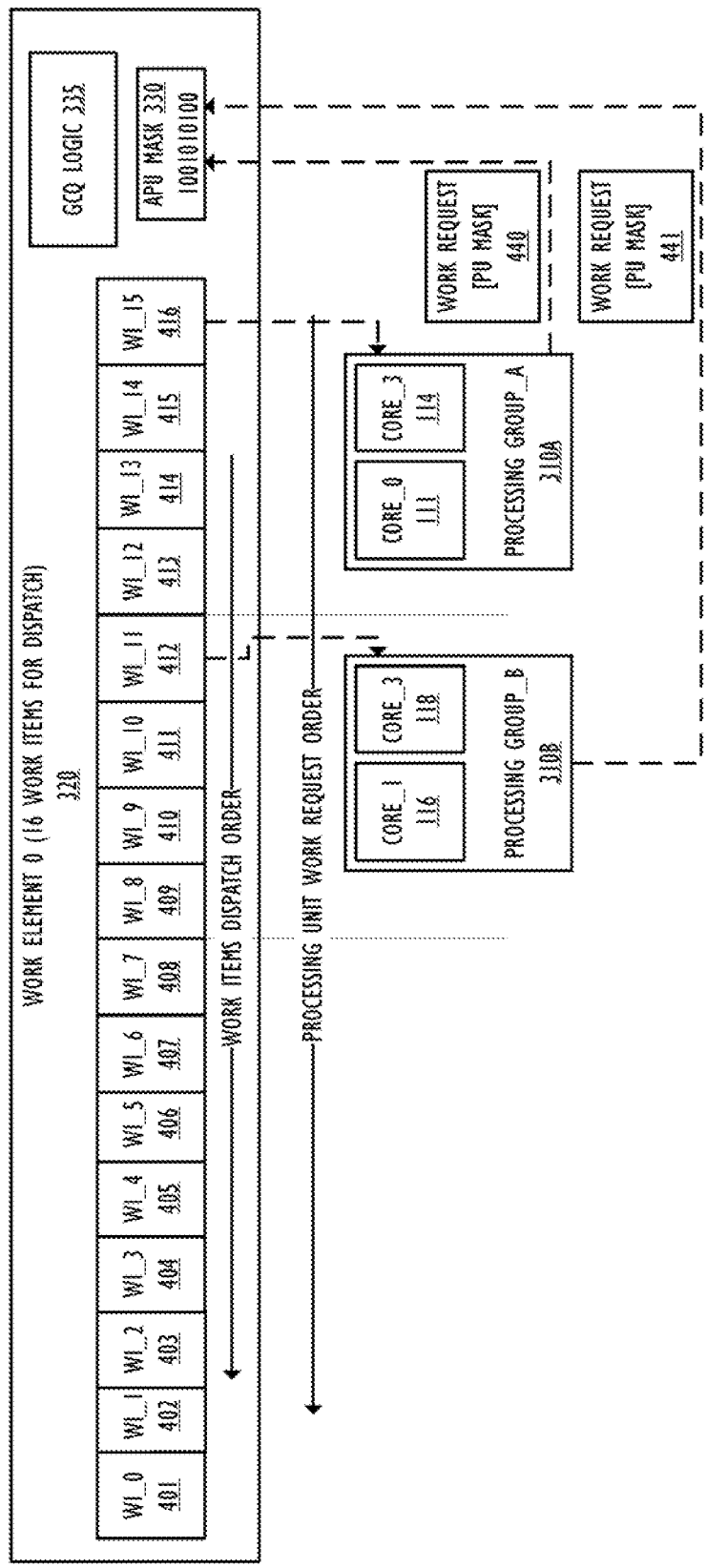
FIG. 4 illustrates a work request operation with subsequent retrieval of work items from a work element by processor cores whose PU mask matched the APU mask of the work element, according to one embodiment.
Figure 5A:
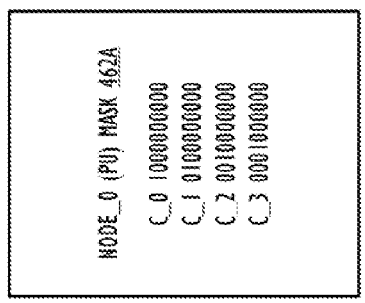
FIG. 5 (A and B) illustrates a logical comparison of a PU mask of a processor core to an APU mask of a work element within the GCQ to determine which processor cores are allowed to retrieve work items from the work element, according to one embodiment.
Figure 5A:
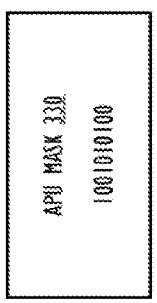
Figure 5A:
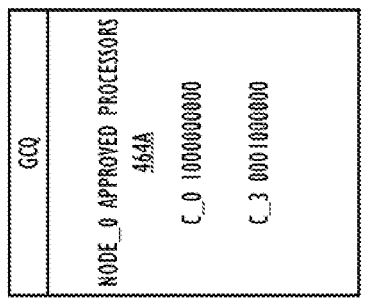
Figure 5B:
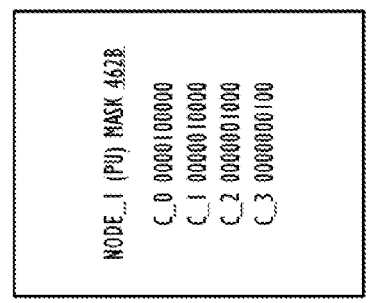
Figure 5B:
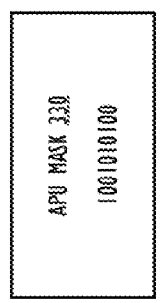
Figure 5B:
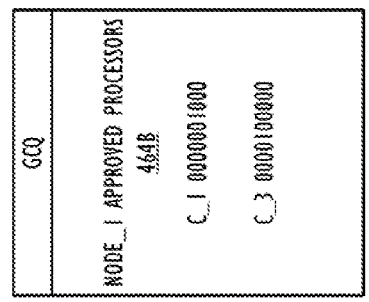

Referring now to FIG. 4, there is illustrated an expanded view of the work items within WE_0 an the associated APU mask 330 which provides access to the work items by select ones of the processor cores within example system architecture 300. As shown, WE_0 comprises 16 individual work items, from work item zero (WI_0) 401 through WI_15 416. The work items are dispatched to requesting processor cores in a particular dispatch order, which for purposes of illustration, is assumed to be in descending order (WI_15 416, WI_14 415, and so on) until the last work item WI_0 is assigned to a processor core. Associated with WE_0 is APU mask 320, which has a mask value of 10010101. The present example assumes that only processing node A 310A (FIG. 3) and processing node B 310B (FIG. 3) are represented within APU mask, such that a maximum of eight (8) processor cores from these two processing nodes may be assigned to process WE_0. Processing node C 310C does not include any approved processors (and the corresponding mask bits are 00 at the end of APU mask).

As shown by the example bit mask in FIG. 4, with a three node implementation, each of nodes A and B having four processing units/cores and node C having two processing units/cores, APU mask 330 includes 10 bits, one for each of the processing cores, such that if the work element within GCQ is intended to be processed by node A (having cores 0 through 3), then one of the first four bits in APU mask 330 will be set to 1. Conversely, if the work element is not intended to be processed by any processor cores in node C (having cores 8 and 9), then all of the last two bits in APU mask 330 will be zero (i.e., the bits are not set to 1).

In the example of FIG. 4, APU mask 330 provides that four processor cores out of a total of ten (10) possible cores within the system are selected and/or assigned to process work for WE_0. With APU mask 330, each bit corresponding to each selected processor core is set to one (1), while the bits corresponding to the other processor cores remain zero (0). Thus, with ten processor cores in the overall system, for example, an APU mask value of 1001010100 indicates that processor core 0, 3, 5, and 7 have been selected to process the WE_0. With processing nodes A, B and C of processing system 300 (FIG. 3), these mask bits correspond to core0 111 and core3 114 of processing nodeA 310A and core1 116 and core3 118 of processing nodeB 310B. For illustrative purposes, these processor cores are also shown as belonging to processing groups, which in one alternate embodiment enables work to be dispatched/grabbed at a processing group level (or node level) rather than the independent grabbing of work by each processor core. It should be noted, that in an alternate embodiment, a node-level allocation of work items can be implemented by which all processor cores in a particular node share the same node mask and the APU mask only tracks selected processor nodes. With the above example, of the three available nodes within the overall system, node A and node B are the selected processor nodes, and the value of the APU mask would be 110, with each bit representing a separate node. The efficiencies of performing the comparisons of the APU mask against the node masks are clear from the significant reduction in the number of bits that have to be tracked by GCQ logic 335.

FIG. 4 also illustrates part of the process by which the various processor cores attempt to "grab" work from GCQ 320, and specifically WE_0. When a processor core needs work, the core issues a work request, such as work request 440/441 to GCQ 320. The work request (440/441) is received and processed by GCQ logic 335 (FIG. 3). The work requests 440/441 comprise PU mask of the requesting processor core, as well as a chunk size parameter, indicating the amount of work (e.g., number of work items) the processor core would like to grab with the request. GCQ logic 335 and/or work request logic of the requesting processor core compares the PU mask of the processor core with the APU mask to determine whether the processor core may grab work items from WE_0. FIG. 5 provides an illustration of one method of completing this comparison. As provided by FIG. 5, each processor core has an associated PU mask. When the processor core issues a request to the GCQ for work, the GCQ logic 335 performs a logical AND of the PU mask of the processor core with the APU mask 330 to generate a result (i.e., a 1 or 0), where the result (if a 1) indicates that the processor core is approved to grab work from the corresponding work element. According to the example of FIGS. 4 and 5, the AND operation with first operand of APU mask 330 (with value of 10010101) with second operands of different PU masks (311-318) of the eight processor cores from the example system yields a "1" output/result for core0 111 and core3 114 of processing nodeA 310A and core1 116 and core3 118 of processing nodeB 310B.

Thus, as provided by FIG. 4, these approved/assigned processor cores are then able to grab work items in the work item dispatch order for execution by the respective processor core. For illustrative purposes, one or more processor core(s) of processing nodeA 310A grab a first set of work items, while one or ore processor core(s) of processing nodeB 310B grabs the next sequential set of work items. However, the order in which processing cores grab work items is not dispositive, as long as the work items are grabbed in a known sequence, which is maintained by the scheduler and/or compiler, to enable re-creation of the output.

In the above described work scheduling and dispatch method and system and according to the described embodiments, execution units process the commands from a single GCQ comprising multiple queue entries. Within the GCQ, each entry holds a work element (or work group) comprising multiple work items that are dispatched for execution by specific processing units identified by the APU mask 330 assigned/linked to the work element. As provided by the described embodiments, the execution/processing units are processing cores, which may be located across a distributed network. However, while processor cores are employed throughout the described and illustrative embodiments as examples of execution units, in other embodiments, the execution units may be any device that executed a command, including, but not limited to, processing codes, CPUs, threads, and even complete computing systems. Once a command is available on GCQ 335, each processor core allowed to participate in the execution of the command (as identified by the APU mask) atomically decrements the command's work items remaining (WIR) counter by a work reservation size (or chunk size) associated with the processor core. The processor core reserves a corresponding number of work items within a work group range for processing. Once the processor core has executed the requested work items, the processor core attempts to reserve more work items. This reservation and dispatch of work items in a given reservation size by multiple processor cores continues until the total number of work items within one entry of the command queue(s) have been processed.

Figure 7:
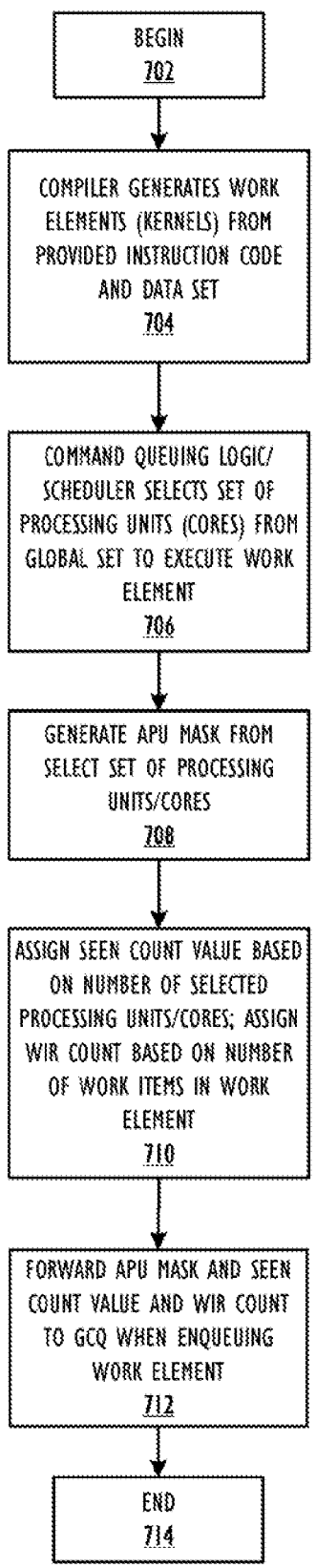
FIG. 7 is a flow chart of the method by which select processor cores are allocated for dispatching a work element and a corresponding APU mask and count variables are generated and assigned to the work element within the GCQ, in accordance with one embodiment.
Figure 8:
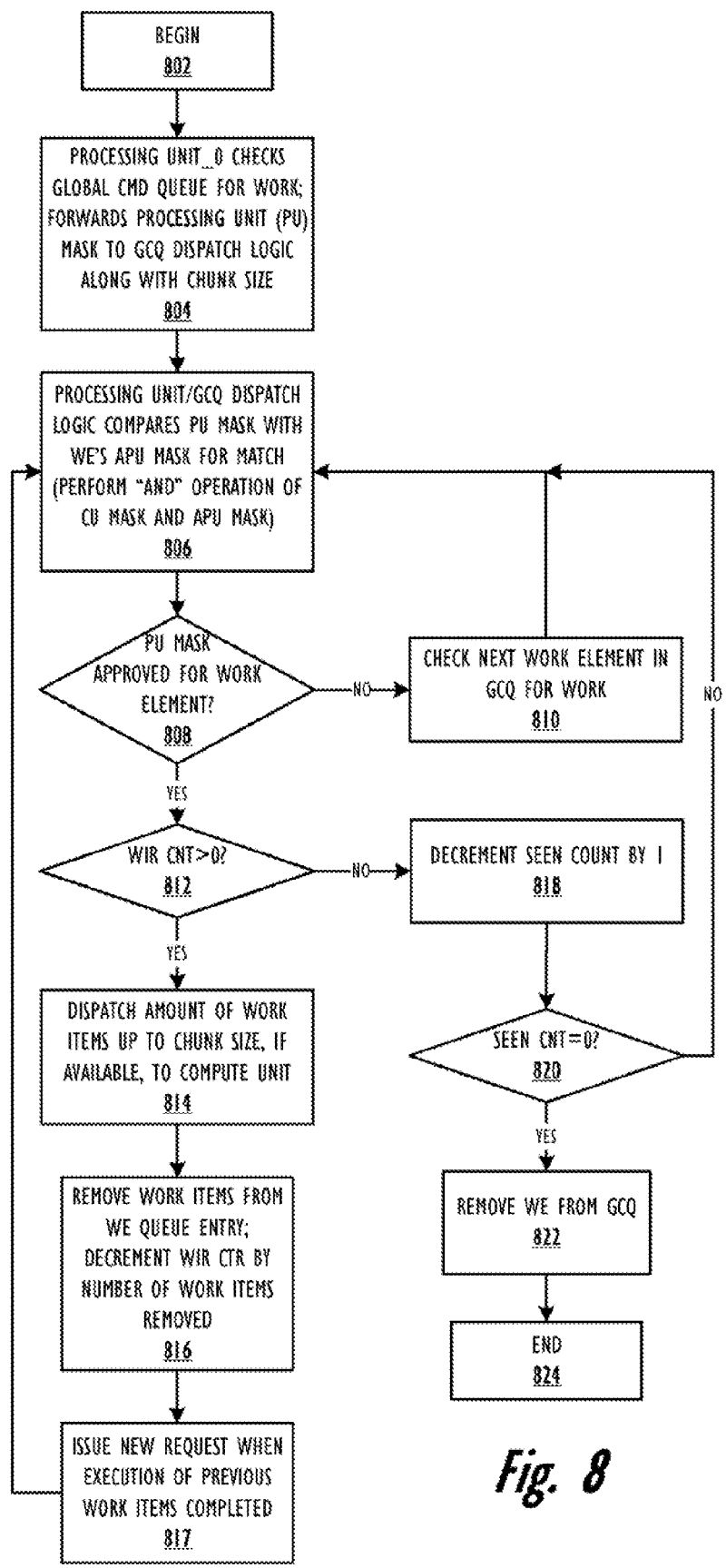
FIG. 8. is a flow chart of the method by which processor cores are verified for allocation of work items from the work element in the GCQ utilizing the APU mask and count variables to track completion of execution of the work items and the work element, according to one embodiment.

With the above functionality of assigning work to processing cores utilizing a GCQ, APU masks and PU masks, the process for scheduling and completing all work involves one or more methods that involve generation and tracking of various parameters to enable efficient work scheduling, dispatch and execution. FIGS. 7 and 8 provide flow charts of example methods for completing the above processes. The methods of FIGS. 7 and 8 are best understood when read in the context of the illustrations of FIGS. 3-5 described above, as well as with reference to FIGS. 6A-6D, which are concurrently described. It is appreciated that the methods may be recursive in nature; However, to simplify the descriptions, only a single iteration of each method is illustrated and described. Various portions of the method(s) are performed by processing unit executing instruction code of the executing task/thread, while other portions may be performed by firmware/logic associated with or executing on the processor. The method(s) is/are generally described from the perspective of processor operations, although it is understood that alternate embodiments of the method may be performed by GCQ logic 335 and GCQ scheduler (logic) 315, for example.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The method of FIG. 7 begins at block 702 and proceeds to block 704 at which the compiler generates work elements (kernels or commands) from instruction code provided by a source program. The compiler 305 forwards the commands/kernels 310 to the GCQ scheduler 315. During runtime, the scheduler (logic) 315 selects a set of one or more of the available processing units (processor cores) from a global set of available processing units to execute the command/kernel 310, as shown at block 706. GCQ scheduler 315 also generates the APU mask corresponding to the selected set of available processing units, at block 708. As shown at block 710, GCQ scheduler 315 also assigns (a) a seen count value based on the number of selected processing units and (b) a work item remaining value based on the number of work items associated with the work element. In an alternate embodiment, the WIR count may be generated and updated by GCQ logic 335, perhaps based on a detection of the actual work items scheduled within work element. Finally, as proved at block 712, GCQ scheduler 315 forwards the APU mask 330, seen count, and WIR value to GCQ 320 when an entry becomes available in GCQ 320. The process then ends at block 714.

At the termination of the above processes, GCQ 320 comprises an entry populated by the work element and associated properties, parameters and attributes. Referring again to FIG. 6A, WE_0 is populated in the first entry of GCQ 320 and is ready for dispatch of its 16 work items by the four approved processing units identified by the APU mask.

Turning now to FIG. 8, which depicts the method by which the work items of WE_0 are dispatched by the processor cores of the system. The method begins at initiation block 802. At block 804, first processing unit (e.g., processor core_0 311) issues a request to the GCQ to check the availability of work. The request provided by first compute unit comprises its PU mask and the chunk size, which are forwarded to GCQ logic 335. At block 806, the processing unit (or the GCQ logic) compares the PU mask with the APU mask of the first work element (and subsequent work elements, if unsuccessful in scheduling work), and determines at decision block 808 whether the comparison of the PU mask with the APU mask indicates that the PU is approved/authorized/pre-selected to grab work items from that work element. According to one embodiment, and as illustrated by FIG. 5, the process by which a processing unit confirms that it is one of the selected processing units to execute a particular work element involves performing a logical AND of the APU mask of the work element and the PU mask of the processor core. If the processing unit is not approved/authorized/pre-selected to execute work items of the work element, GCQ logic 335 forwards the request to a next work element in the GCQ, as shown at block 710. Thus, the request from the processor core moves on up the GCQ to the next entry, and the same check is performed against the APU mask of the next work element with the PU mask in the request. In this manner, a processor core only removes work from a work element when that processor core has been pre-selected by the scheduler to execute work of that work element.

As further illustrated by FIG. 6D, the processing units that are not approved for processing WE_0 may also concurrently schedule work from a different work element at which the processing unit is approved. For example, processing unit 2 of processing node A 310A may schedule work from WE_1 within GCQ 320, after first being rejected at WE_0. When work items are scheduled on processor core 1, the WIR counter and the seen counter of WE_1 are decremented. As shown, WIR counter of WE_1 is decremented by 10 as ten work items are scheduled on processing unit 2, and the seen count of WE_1 is also decremented by one (1).

When the processor core has been confirmed as an approved/authorized/selected processing unit, GCQ logic 335 then checks the value of the WIR counter, and determines at block 812, whether the WIR count is greater than zero (0). When the WIR count is not greater than zero, GCQ logic 335 decrements the seen count value by one (1), as provided at block 718. When the WIR count is greater than zero (0), GCQ logic 335 allows the processor core request to pull/grab an amount of work items form the work element up to the chunk size identified in the request, as indicated at block 814. GCQ logic 335 monitors the removal/dispatch of the work items from the queue entry and decrements the WIR counter by the number of work items removed, as shown at block 816. The process then proceeds to block 817, which issues a new request when execution of the command on the previously retrieved work items have completed. The same processor core may thus continually issue requests to the GCQ and retrieve work from the same work element until all work of that work element has been assigned.

It is important to note that the number of work items remaining to be dispatched for execution may be less than the chunk size requested by the processor core. In this scenario, all of the remaining work items are provided to the requesting processor core, and the WIR counter is reduced to zero (0). Also, in an alternate embodiment, the chunk size is pre-set within the GCQ, such that either (a) all processor cores are allowed to take the same chunk size of work or (b) larger chunk sizes can be requested but are scaled as whole number multiples of the pre-set chunk size. In the presently described embodiment, the chunk size is parameter set by the processor core (or processing node) and encoded within the request.

The value of the WIR counter is utilized to determine when more work items are available for grabbing, and is decremented each time work items are allocated to a requesting, approved processor. As indicated by the sequence of FIGS. 6A-6D, as each approved processor removes its chunk size of work from the work element, the GCQ logic decrements the WIR counter by the number of individual work items removed (e.g., the chunk size). For illustrative purposed, a single chunk size is assumed of four (4) work items. Thus (referencing WE_0 of FIG. 4), a request issued by a first processor unit (e.g., request 440 from processor core0 311) removes work items 15 through 12 from WE_0. GCQ logic 335 decrements WIR counter from 16 to 12 (FIG. 6B). Similarly, when second processor unit request 442 from processor core 1 316 removes work items 11 through 8 from WE_0, GCQ logic 335 decrements WIR counter to 8, and so one, until WIR counter equals or goes below zero (0) (FIG. 6C).

The above method processes describe the GCQ scheduler and/or GCQ logic queuing a work element within the GCQ and the processing elements subsequently removing work from the work element for execution. These processes include/involve GCQ logic 335 (or other logic) updating/modifying certain parameters/attributes of/associated with the work element to enable sequenced retrieval of different work items by each approved processing unit that submits a request for work. An additional mechanism is provided to also track when dispatching of all work from the work element has completed, in order to allow the work element to be removed/discarded from the GCQ.

Work elements are released from the command queue when all the cores within the overall system or all the cores selected to dispatch the work element (depending on implementation) have seen the work element and do not need to process the work element further. Tracking of the number of processing units that have seen the work element is provided by an atomic decrement of a seen counter that begins with the total number of processor cores, and is decremented each time a different one of the processing units "looks at" (i.e., attempts to schedule work from) the work element. When the last processor core has seen the work element, the seen counter is decremented to zero and the last processor core then notifies GCQ scheduler 315 or GCQ logic 335 that execution of the work element has completed.

Returning now to block 812 of FIG. 8, when the WIR counter value of a work element is zero (or less than zero), indicating that no more work items remain to be dispatched, and a request from an approved processing unit is received, GCQ logic 335 decrements the seen counter by one (1), as provided at block 818. At block 820 of the flow chart, a decision is made whether the seen count equals zero (0). If not, GCQ logic 335 monitors for receipt of subsequent requests from each other approved processing unit, and decrements seen count for each request received from a different, approved processing unit. Once all the approved processing units have submitted requests that are rejected because there is no more work to dispatch, the seen count is finally decremented to zero. The decrementing of seen count for WE_0 is illustrated by FIGS. 6C-6D. Once seen count becomes zero, the work element is removed from or overwritten in the GCQ 320, as shown at block 822. The process then ends at block 824.

Features of the provided embodiments can advantageously be implemented in multi-node processing systems which exhibit low data transfer latencies and low cross communication latencies between the processor cores and a memory location of the local node. Given that the processing nodes are retrieving work from the central/common GCQ, the latency to the GCQ for the different nodes is relative short, such that the overall work retrieval process incurs an acceptable latency penalty in overall processing time for the processing cores that are grabbing work from the GCQ 320.

With the implementation of the single command queue, the need to synchronize across multiple command queues of multiple nodes is substantially eliminated. The described embodiments are adapted for implementation on multi-processor compute systems (or system architecture) that exhibit small penalty (latency) when synchronizing across compute nodes. For example, with NUMA nodes that are connected via a "local" fabric, such as within a single physical device (e.g., local processing system 301), there is a relatively small latency penalty when synchronizing distributed work of a single kernel (work element) across the multiple nodes. This further enables the completion of N Dimensional work and data intensive operations to/on NUMA systems with low cross node latency.

Also, with the described embodiments, there is no longer a requirement for multiple individual command queues that are each tied to a separate node in order to support NUMA affinity. With the single GCQ implementation, each work element within the single GCQ includes a mask field comprising N bits, with specific bits set to identify which execution nodes and/or which processing unit(s) (or processor cores) are linked to the work element for completion thereof. The N bit mask provides a unique identification of each separate node and/or processor core so that the same single command queue can be utilized across multiple nodes, while allowing the nodes/cores to correctly grab work assigned to the particular node/core from the GCQ. Because the present description of one embodiment includes specific reference to a NUMA system architecture, the N bit mask may also be referred to within this embodiment as a NUMA mask, and each executable element (e.g., core_0 311) is assigned a NUMA mask that is unique for the particular node or the particular processing unit (depending on the level of granularity desired). When a new command is placed in an entry of the single GCQ, the new command (work element) is marked/tagged/assigned/affiliated or otherwise associated with a specific NUMA affinity via the NUMA mask.

The above embodiments are applicable to systems that have NUMA regions close enough so they can share the GCQ efficiently. This is especially true for workloads where a common function is being executed multiple, independent times. Each work element in the GCQ contains an APU mask, work remaining count (in the case of multiple iterations of a process), and a seen count. With these functional variables and system configuration, a work element within the GCQ is scheduled as follows: (a) the processing unit checks if the processing unit's NUMA bit is set in the next work element's APU mask; (b) if the processing unit's NUMA bit is not set in the APU mask, the processing unit decrements the seen count, indicating that the unit has finished with the work element, and the processing unit advances to the next element; (c) If the processing unit's NUMA bit is set, the processing unit decrements the work item remaining (WIR) count by a tunable "chunk size", based on the actual amount of work retrieved from the work element by the processing unit; (d) If the result of the decrement is a value indicating that there is no more work (e.g., 0 remaining work items), the processing unit decrements the seen count, which indicates that the processing unit has finished with the element. The processing unit then advances to the next work element; (e) if the processing unit is the last processor core to see the element (i.e., seen count is equal to zero), indicating all the processor cores have seen the work item at least one, the processing unit marks the location in the global queue as "free."

At the processing unit (processor core), the processing unit executes each work item in that retrieved chunk until the execution of the chunk of work is completed. The processing unit then issues a next request to the queue to get more work.

Certain of the features of the described embodiments may lend themselves to N Dimensional (ND) Range processing/execution paradigms, such as provided by OpenCL™ and similarly structured applications executed on multi-core data processing systems in which an execution command contains the information necessary to efficiently execute and balance work load of the command, which may include data or task parallel processing requirements. Each command includes information corresponding to the total number of work groups within the command to be executed, the number of work groups remaining to be computed, the number of work groups already processed, the number of work groups to process at a time (reservation size). Other information provided by the commands may include the number of execution threads to process in the command and the number of execution threads that have seen the command.

Within this ND Range execution paradigm, and according to the presently described embodiments, execution units process the commands from a single global command queue comprising multiple queue entries. Within the GCQ, each entry holds a work element comprising the command and multiple work items that are dispatched for execution by specific processing units identified by an APU mask assigned/linked to the work element. As provided by the described embodiments, the execution units are processing cores, which may be located across a distributed network. However, while processor cores are employed throughout the described and illustrative embodiments as examples of execution units, in other embodiments, the execution units may be any device that executed a command, including, but not limited to, processing codes, CPUs, threads, and even complete computing systems. Once a command is available on the global command queue, each processor core participating in the execution of the command (as identified by the APU mask) atomically decrements the command's work items remaining (WIR) counter by a work group reservation size (or chunk size) associated with the processor core. The processor core reserves a corresponding number of work items within a work group range for processing. Once the processor core has executed the requested work items, the processor core attempts to reserve more work items. This reservation and dispatch of work items in a given reservation size by multiple processor cores continues until the total number of work items within one entry of the command queue(s) have been processed.

C. Architecture for High Latency Processing Nodes

The above described embodiments operate well for low latency processing nodes, by which all work items are processed on the same node of local node group exhibiting low latency between processor nodes and the GCQ. Thus, with these embodiments, there is a need for a approved processing node bit mask (e.g., eight bits of 1s and zeros representing which node has been assigned processing permission for the particular work element). With low latency operation, the nodes each process in chunks (or groups of 4 work elements) until the total number of sub-elements (e.g., 16) have been processed, and all nodes (8) have seen the work element. With the seen counter for the nodes, if there is no work left to do at the work element, then the logic decrements the seen count from 8 to 7, then 6, and so on, until the seen count=0. If there is work to assign, then GCQ logic assigns with chunks of 4 and the unassigned attribute/counter has been change from 16 to 12 then to 8 then to 4, then zero. Once the number of un-processed element count reaches zero, there is no more work associated with that work element. The processing nodes then come in and check the command queue and each one decrements the compute unit counter from 8 to 7, and all the way to zero. Once the seen counter reaches zero, the entry of the command queue hosting the work element is freed up for assignment of a new work element.

For systems in which at least one processing node exhibits a larger latency penalty when communicating with other processing nodes and to a general system memory construct, such as the GCQ, an additional mechanism is provided by which the high latency processor cores are able to efficiently retrieve and dispatch work from the GCQ without providing a large number of requests on system fabric. Work contention for such high latency processing nodes with the low latency nodes within the system, if any, or other high latency nodes is substantially reduced.

In prior art systems of GPU, the entire work completion waits for the slowest GPU to complete processing. With systems employing both PPUs and SPU, the PPUs are generally much slower leading to a stealing of work by the SPUs as the longer latency PPUs get starved out of processing a lot of work.

Within the illustrative embodiments, described below, each processing node shares a single global command queue, and each processing node also maintains a "staging queue". The size of the staging queue is equal to that of the global queue. Work is pulled, piece-wise, into the staging queue where the locally staged work is shared by all processor cores in the single processing node. With one embodiment, the system infrastructure provides for a single GCQ and multiple (up to Y) LCQs, where Y represents the total number of processing nodes. Each node may be a NUMA node, but the invention is of course applicable to other types of multi-node, distributed processing systems. All queues have the same number of work elements and work element X in the global queue corresponds to work element X in the NUMA queue. The scheduler places work to be done in the global queue. During local execution, all work is fetched by the processor cores first from the staging queue (LCQ), and work is only fetched from the GCQ when there is no work within the LCQ.

Figure 9:
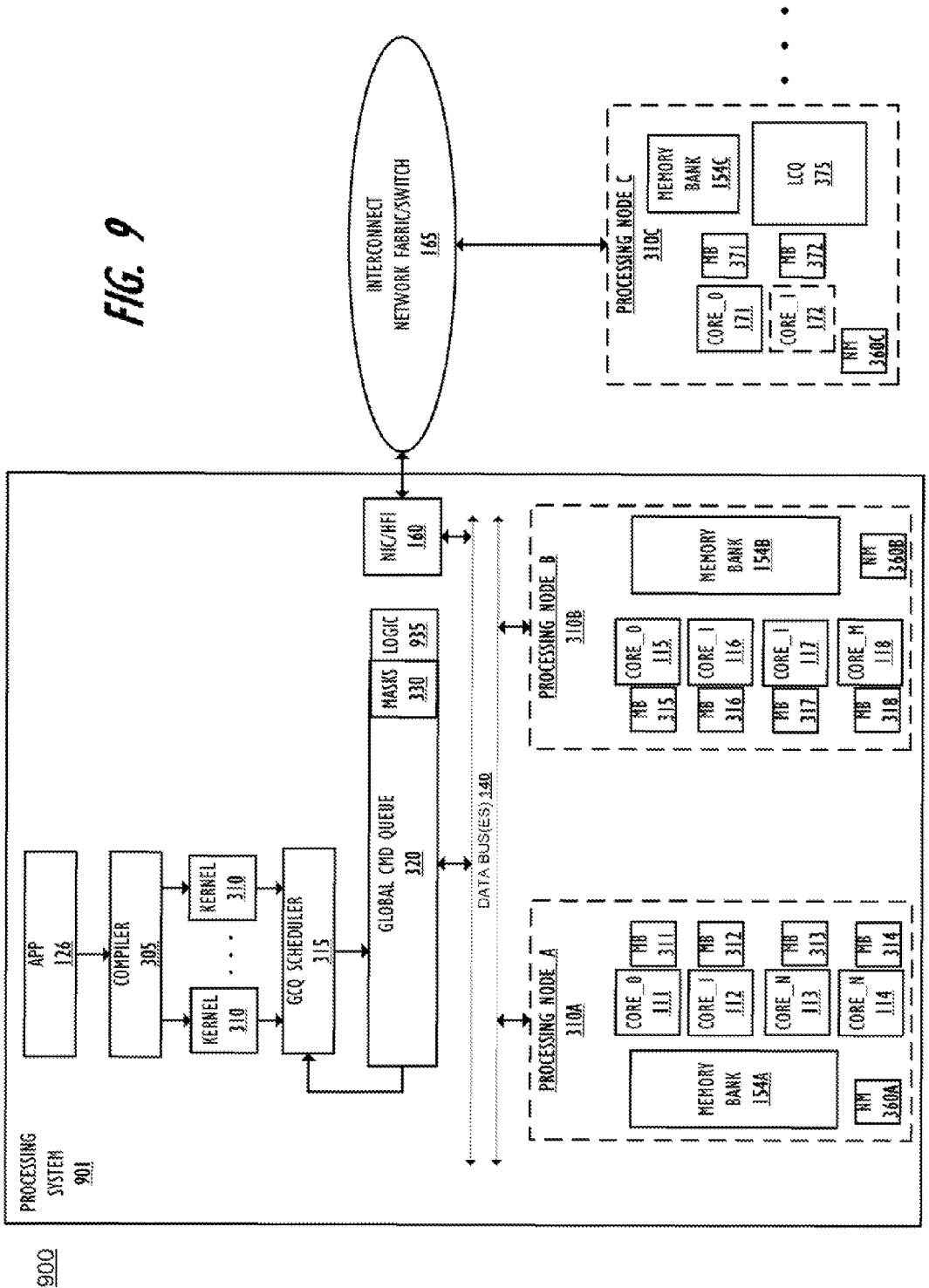
FIG. 9 is a multi-node processing system architecture with high latency between one or more processing nodes and the GCQ, where efficient processing of a work element is supported by local work queues provided at each processing node, in accordance with one embodiment.

Referring now to FIG. 9, there is illustrated an example distributed processing system architecture 900 with a somewhat similar configuration as that of FIG. 3, which has been previously described. Because of the overlap in the two figures, the common components in FIG. 3 are not described in detail for FIG. 9. However, FIG. 9 provides certain structural and functional differences, which will now be described.

In addition to the implementation within multi-node processing system architecture 900 of GCQ 320, as well as unique node mask bits per node and/or unique execution unit mask bits per execution unit (depending on granularity implemented), multi-node processing system architecture 900 further includes local command queue (LCQ) 375 within processing node C 910. With this configuration, processing node C 900 is assumed to exhibit high access latency to the GCQ 320 relative to a pre-determined threshold latency value below which value access by a processing unit to the GCQ is identified as a low latency operation. LCQ 375 enables the high latency processing node to stage a larger chunk of work items retrieved from GCQ 315 in a local storage area, LCQ 375. With the larger chunk of work items locally staged, the high latency processing node spends significantly less time contending on the global interconnect with other nodes and/or at the GCQ for work, and the high latency processing node is able to spend more time doing useful work on the retrieved work items. With this illustrative embodiment, the other processing nodes are assumed to be low latency nodes and do not require a LCQ for processing work items retrieved from GCQ 315.

Supporting the retrieval of a larger chunk of work items from GCQ 320 is GCQ logic 935, which for purposes of the present disclosure is assumed to provide additional logic to support work allocation of variable chunk sizes. According to one embodiment, GCQ logic 935 also provides dynamic modification of chunk sizes allocated to high latency processor nodes based on an analysis of historical latency data, prior work allocation data, current chunk size requested, amount of remaining work for the work element, and efficiencies of allocating larger chunk sizes to the high latency nodes (910).

Figure 10:
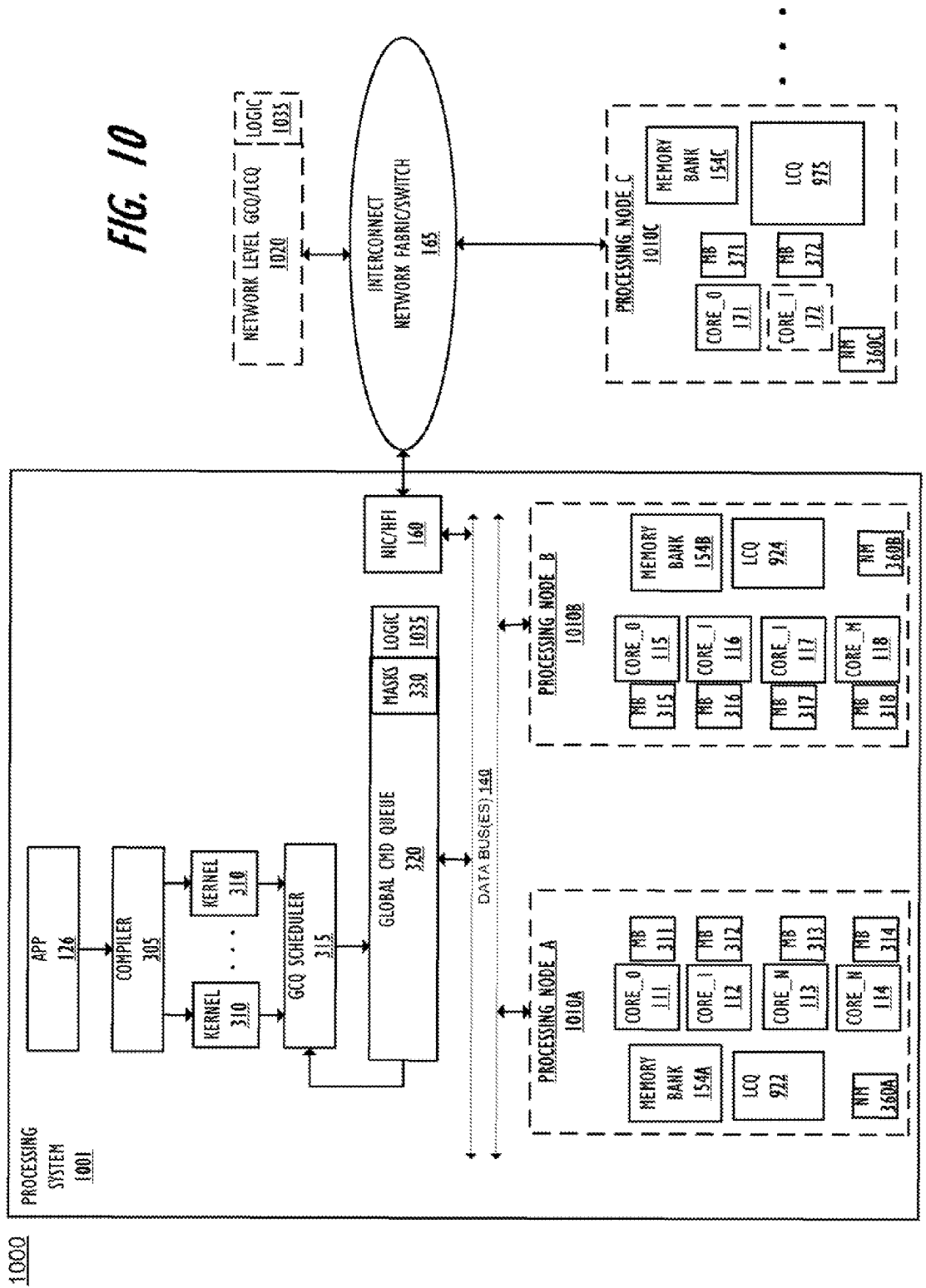
FIG. 10 illustrates a hybrid multi-core data processing system architecture with local work queue provided only for those processing nodes that have a high access latency to the GCQ, according to one embodiment.

FIG. 10 provides a second representative illustration of a multi-node processing system 1000 in which each processing node is provided an LCQ. Thus processing node A 1010A has LCQ 1022, while processing node B 1010B has LCQ 1024, and processing node C 1010C has LCQ 975. With this configuration, it is assumes that all processing nodes within the overall multi-node processing system 1000 are high latency nodes and thus each node includes an LCQ for staging work items retrieved from GCQ 320. The LCQ logic thus operates as work scheduling logic within the respective processor nodes. It is important that while illustrated as a separate component within the respective processing node, each LCQ may be a specific range of address space within the local memory bank (154A-154C) of the respective processing node (1010A-1010C). Regardless of where located, the location of the LCQ is considered "local" to the particular processing node in that the processing units within the processing node are able to access the LCQ with relatively low latency. In the illustrative and described embodiments, the latency of operations between the local processing units and the LCQ is a substantial factor smaller than the latency of similar operations with the GCQ 320. Also, as will become clearer below, in one embodiment, there is no contention for access to the work items staged within the LCQ with processing units of other nodes.

In an alternative embodiment, however, a cluster of nodes that form a local processing group may exhibit low access latency (below a second threshold latency value) to an LCQ that is not necessarily located on the same processing node as each execution unit. With this alternate embodiment, each such local processing group is assigned an LCQ, such that the LCQ is assigned across multiple nodes but provides low access latency to all execution units within those nodes. Because access to the GCQ 320 from these execution units within the processing group exhibit high access latency, larger chunks of work items are staged at this cross-node, shared LCQ for access and dispatch by the different execution units within the local processing group.

In a general sense, LCQ 375 is provided to reduce the number of times processes across high latency nodes hit a single memory location (e.g., GCQ), irrespective of the presence of low latency nodes within the system, which may or may not access a same LCQ. In one implementation, and as illustrated further by FIG. 10, system architecture 1000 may provide a network level GCQ 1020 and associated logic 1035. With this configuration, the actual location of GCQ relative to the processing nodes, including the node at which the work is generated, is inconsequential, as the GCQ 1020 then provides a network staging area for placement of work items that are dispatched across the network interconnect/fabric. Similarly, as well, GCQ 1020 may just as easily be an LCQ that is network accessible rather than being physically situated on the processor nodes of the processing units which access the LCQ.

According to one embodiment, a local copy of work item remaining (LWIR) count is maintained in the processor node to track the work items within the LCQ that remains to be dispatched to one of the local execution units. Thus during operations at the processor node, which operations involve work being retrieved from the LCQ, the LWIR is updated (decremented) until the LWIR count reaches zero (0). During this period, no update of the global count is required or performed. However, once the last execution unit performs an update of the LWIR count value and subsequently reduces the LWIR count within the LCQ to zero (0), that last execution unit forwards an update to the GCQ. Thus the updates to the head queue only occur once all work has completed at the local node. Also, since only the last execution unit performs an update of the GCQ WIR count value, only one node update to the LWIR count is required, and the GCQ update is performed only after all local updates of the LWIR count are performed. The embodiments thus enable an atomic decrement of the local count, and the last compute unit that decrements the count to zero then knows that it is responsible for providing the atomic update to the global count.

By requiring only the last execution unit to decrement the count value to communicate with the GCQ, the node logic reduces cross chatter on the interconnect fabric because the GCQ only has to be updated once per region instead of once per workgroup. The described embodiments works very effectively with example systems with a high penalty for going across processor nodes.

As with the operations within GCQ 320 described above with reference to FIG. 6A-6D, each work element in the LCQ tracks the number of computer units (e.g., 4 in the illustrative embodiment), and the work elements may include multiple executable processes/tasks/elements for completion (e.g., a 4,4, dimension space with 16 elements in the illustrative embodiment). With this example system, and assuming high latency processor node 1010C, at least one of the execute units (e.g., processor core 171) is unable to reach the GCQ in time to grab work from the work element, WE_0, which is being scheduled to all three processor nodes, and processor core 171 and 173 effectively starves, leading to inefficiencies in overall processing. With the LCQ, however, the high latency processor nodes are able to grab more than a single chunk of work at a time from the GCQ. The first requesting processing unit of the high latency processor node issues a work request requesting a larger chunk of work. When the larger chunk is returned to the processing node, the work items are stored in the LCQ of the requesting processor (or LCQ associated with the requesting processing unit). Work items are then executed by the different pre-approved local processing units, which grab work from eh LCQ, until all the work is completed.

Concurrently, low latency processing nodes and/or processing units continue to grab a smaller chunk size of work from GCQ, but do so more frequently. Thus, the high latency processor nodes automatically reserve a larger chunk of work than the single work items (or standard chunks reserved by low latency nodes). With the above implementation, contention on a high latency path is substantially reduced, and the high latency nodes also receive enough work to keep processing while the local nodes continue to pound the LCQ at the lower latency and consume new work more quickly but at lower chunk sizes. The example provide by FIG. 10 assumes all processing nodes have significant enough latency of operations with the GCQ for the entire system architecture to be set up to grab multiple chunks of work at a time, and stage that work at LCQs, to reduce cross-node request contention for work items on the request bus.

Figure 11:
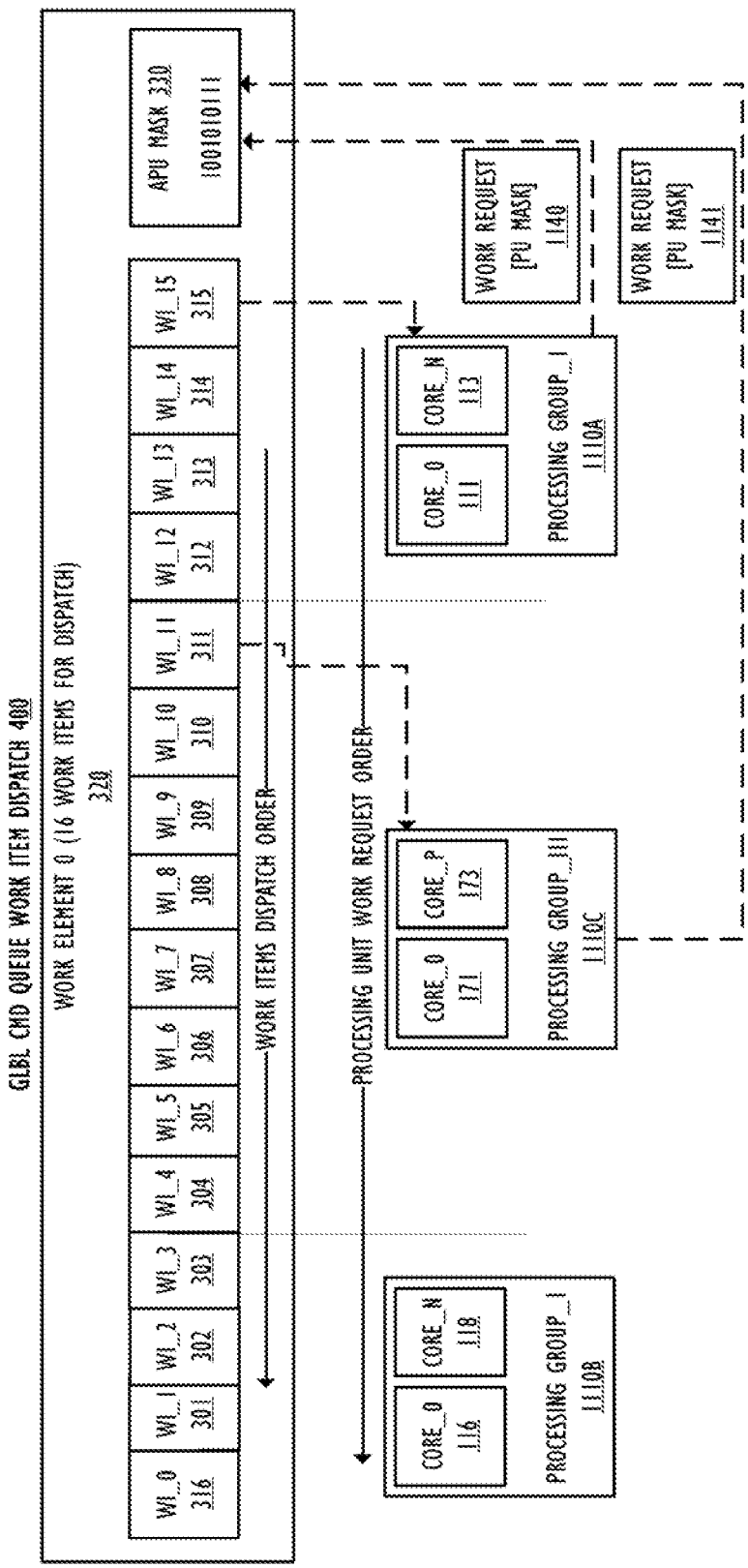
FIG. 11 illustrates work retrieval from a work element by first processor cores with low access latency to the GCQ and second processor cores with high access latency to the GCQ, according to one embodiment.
Figure 12:
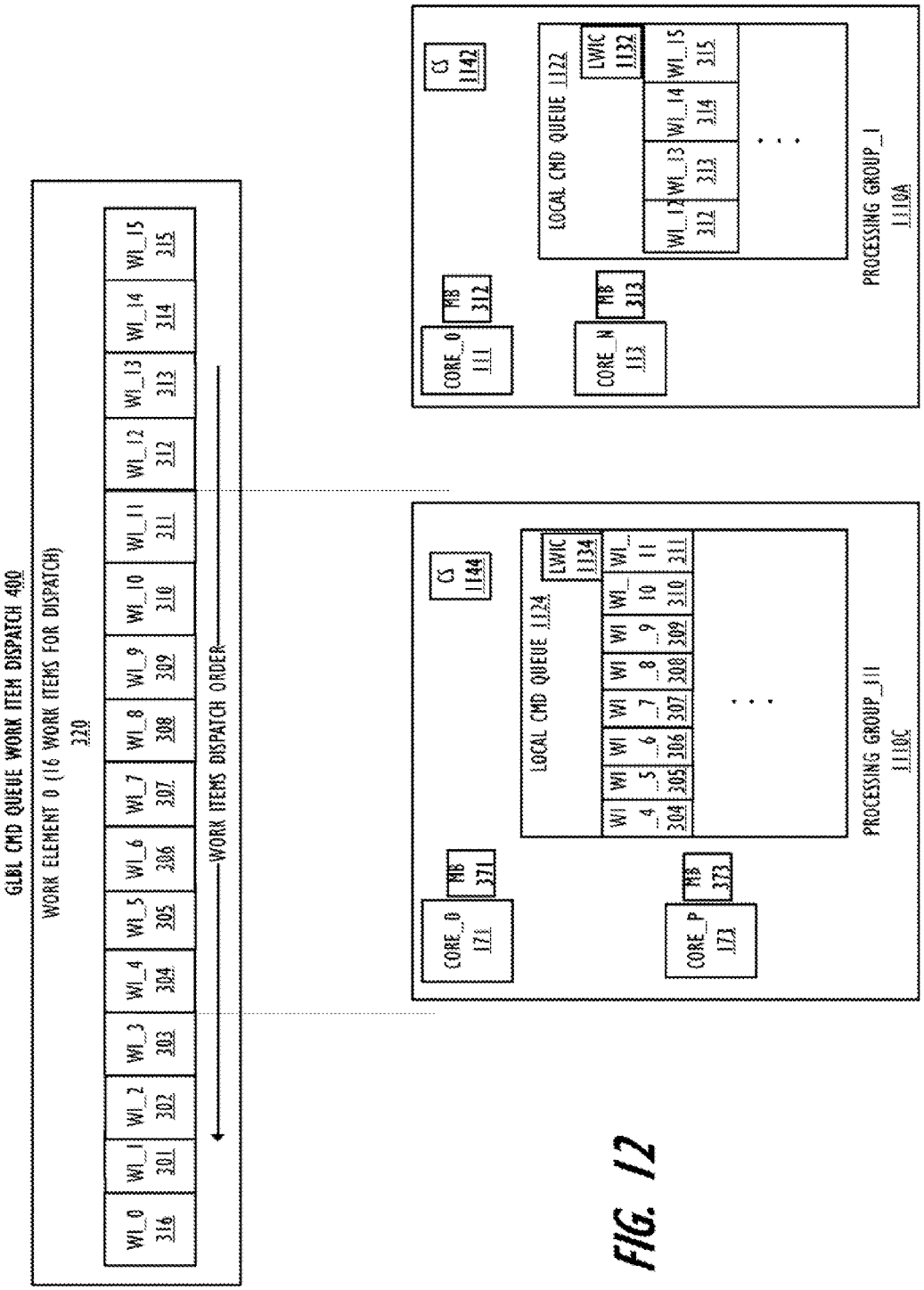
FIG. 12 illustrates work completion processes at a processing node with high access latency to the GCQ via a local work queue, according to one embodiment.

Referring now to FIGS. 11 and 12, there are illustrated sequence diagrams indicating the request and retrieval of multiple different chunk sizes of an example work element in a hybrid work assignment scheme which assigns variable chunk sizes to different processing nodes based on the node's access latency. During initial dispatch for work from the work element, both low latency processor cores 1110A, 1110B and high latency processor core 1110C issue work requests 1140, 1141, respectively. The work requests are received by GCQ logic 1030, which processes the requests for matching PU masks to the APU mask of the work element. As further shown by these figures, work is dispatched in descending order of work items as follows:

Processing group I 1110A receives the first standard chunk of four (4) work items in response to the GCQ logic approving the processing node or requesting execution unit (utilizing the APU mask versus PU mask comparison) as an approved processing node for the work element, WE_0 1122. The allocation of the standard chunk size may be based on one or more of: (a) the actual chunk size encoded within the work request 1140; or (b) the pre-set chunk size encoded within the GCQ logic, which may be for the specific work element or generally for all work elements of the GCQ; or (c) a calculated chunk size based on one or more factors, which includes the latency to the requesting node, the speed of completion of a known chunk size, historical factors, pre-programmed chunk sizes for the particular processing nodes, the amount of work items remaining for dispatch, the number of processing units pre-approved and available to process WE_0 1122; or (d) a combination of the above list of factors (a-c). When GCQ logic processes work request 114 of high latency processing group, processing group III 1110C, and following the approval of the PU mask of the processing group compared against the APU mask 330 of WE_0 1122, GCQ logic allocates a larger chunk size to processing group III 1110C. In the illustrative embodiment, GCQ logic allocates a chunk size that is twice the size of the regular/standard chunk size, or eight (8) work items. GCQ logic performs the allocation based on one or more of the above factors. However, in one or more embodiments, the latency of operations originating from the high latency processing node coupled with the historical speed at which the processing node dispatches assigned work may be primary factors in one or both of: (a) the chunk size requested by the processing node III, which size is encoded within the work request 1141 and represents the chunk size returned by the GCQ logic when no additional calculation is performed at the GCS logic; or (b) the chink size calculated by the GCQ logic, when such calculations do occur. When calculations are performed by GCQ logic, the larger chunk sizes may be a pre-selected or dynamically selected multiplier, such as 2×, 3× ... and so on, based on the actual latency and speed of work dispatch of the high latency processing node.

FIGS. 11 and 12 also shows the work request 1142 from processing group II 1110B, which receives standard chunk size of work items in response to the work request. The order of processing of work requests and/or order of dispatch of work items is not important in the above described sequence. Also, while the illustrative embodiment presents only 16 work items, the embodiments are contemplated as being performed with work elements having hundreds or thousands or more of work items, with chunk sizes ranging from one (1) to X, where X is some integer smaller than the total number of work items. In the extreme case where only one node is processing a particular work element, there is no contention for the work element and thus the chunk size may be arbitrary even for a high latency node. Also, assuming there are two nodes, both of which are high latency nodes, the work element may be placed within a copy of the GCQ or a GCQ located at a different accessible location within the distributed multi-node processing system architecture that reduces the overall latency for both processing nodes.

With specific reference to FIG. 12, the work items retrieved from GCQ are placed within LCQs of the requesting processing node. Each processing node/group 1110A/110C has a corresponding chunk size (e.g., CS 1142 and CS 1144), which may be different for each node and may be dynamically variable, particularly for high latency nodes. Thus, standard/first chunk size of work items, WE_15 through WE_12, are stored within LCQ 922 of processing node A 1010A, while larger/second chunk size of work items, WE_11 through WE_4, are stored within LCQ 924 of processing node C 1010C. In one embodiment, the process of retrieving work from the GCQ may be described from the perspective of logic executing on the processing node and controlling operations of the LCQ (i.e., LCQ logic). During a work request cycle, one execution unit (e.g., core0 171) of processing node C 1010C generates and issues to the system interconnect fabric a work request (1141), which includes the PU mask of the executing unit and/or the node (again depending on granularity of mask implementation). The specific work request 1141 grabs a larger chunk size (specifically two chunk sizes) of eight (8) work items and places the work items in the LCQ when the work items arrive at the processing node 1010C. According to one embodiment, the chunk size attribute may be stored as a pre-set or dynamically calculated parameter of the specific node, and each node may have a pre-set default chunk size and appropriately sized LCQ to hold that chunk size of work items. In another embodiment, the size of the LCQ is variable, as the LCQ is created and maintained within local node memory or within other low latency storage when the LCQ is required for staging work from a remote (high latency) GCQ. The variability of the size of the LCQ may then be tied to the dynamic nature of the chunk size calculation.

Returning to the illustrative embodiment, processing node C has higher (than a pre-set threshold) access latency to GCQ than processing node A 1010A and thus processing node C 1010C retrieves/grabs a much larger chunk size of work for storage in its LCQ 1124 than processing node A 1010A. During work request/dispatch cycles, processing node C 1010C or execution units of processing node 1010C grabs one chunk of four (4) work items containing work items 15 through 12, and stores these work items in Node A's LCQ 1122. Somewhat similarly, processing node C 1010C or execution units of processing node 1010C grabs two chunks of work items containing work elements eleven (11) through eight (8) and seven (7) through four (4) and stores these work elements in Node C's LCQ 1124. As shown in the illustration, the number of work items placed remaining within the LCQs of each processing node is tracked via local WIR (LWIR) counters. Thus, LCQ 1122 is assigned LWIR counter 1132, while LCQ 1124 is assigned LWIR counter 1134. At GCQ 1120, the requested chunk size for processing node C may be modified by a chunk size multiplier (of GCQ logic) or based on a pre-established high latency processor chunk size, which provides for retrieving eight (8) work items rather than a standard chunk size of four (4) work items. While chunk sizes are described herein as multiples of four (4) work items, that number is arbitrary and provided solely for illustration. Any number of work items may be provided within each chunk of work dispatched in response to each work request. Thus, for example, a first work request may be provided three (3) work items, a second work request provided 10 work items and a third work request provided seven (7) work items, with no connection between the number of work items provided to the different requesting nodes. Those numbers may simply be pre-programmed into the respective nodes as the chunk size of work items to request from a GCQ, with some consideration given for the latency of operations on the system interconnect fabric and at the local processing node.

Once the work items are returned to the processing node, the work items are stored within the LCQ. Each node is then responsible for tracking the completion of the particular work elements within their respective local queues. Notably, while the description of the illustrative embodiment is directed to operations on a single work element within a single entry of the LCQ, other embodiments provide that each LCQ may include multiple entries, with each entry mirroring those of the GCQ, but including only a subset of the work items retrieved from the GCQ. With this multiple entry configuration of the LCQs, an idle processing unit may move on to the next work element in the LCQ, rather than having to go to the GCQ for work when all work items of a first work element in the LCQ have been dispatched. This embodiment also allows for the processing units to not become idle when additional work is available from other work elements within the GCQ, for which the processing node has been approved for execution. By retrieving portions of multiple work elements from the GCQ and staging those work element portions within the LCQ, the latency involved in replacing a completed entry of the LCQ with new work items from the GCQ does not cause the local processing units to become idle, unless there is no more work available at the GCQ.

When a single architecture of assigned processing units includes both low latency processing nodes as well as high latency processing nodes, a hybrid model of work dispatch may be implemented, in one embodiment. Thus two different mechanisms are concurrently implemented for scheduling work to processing nodes within the single processing system, with high latency nodes tagging their assigned work items in a LCQ, while processing units of the low latency nodes executing work items retrieved directly from the GCQ, with no local staging required. With this hybrid model, the processing units of low latency nodes grab work for themselves, while a singe processing unit of the high latency nodes grabs work for multiple other pre-selected processing units on the same high latency node.

Figure 13:
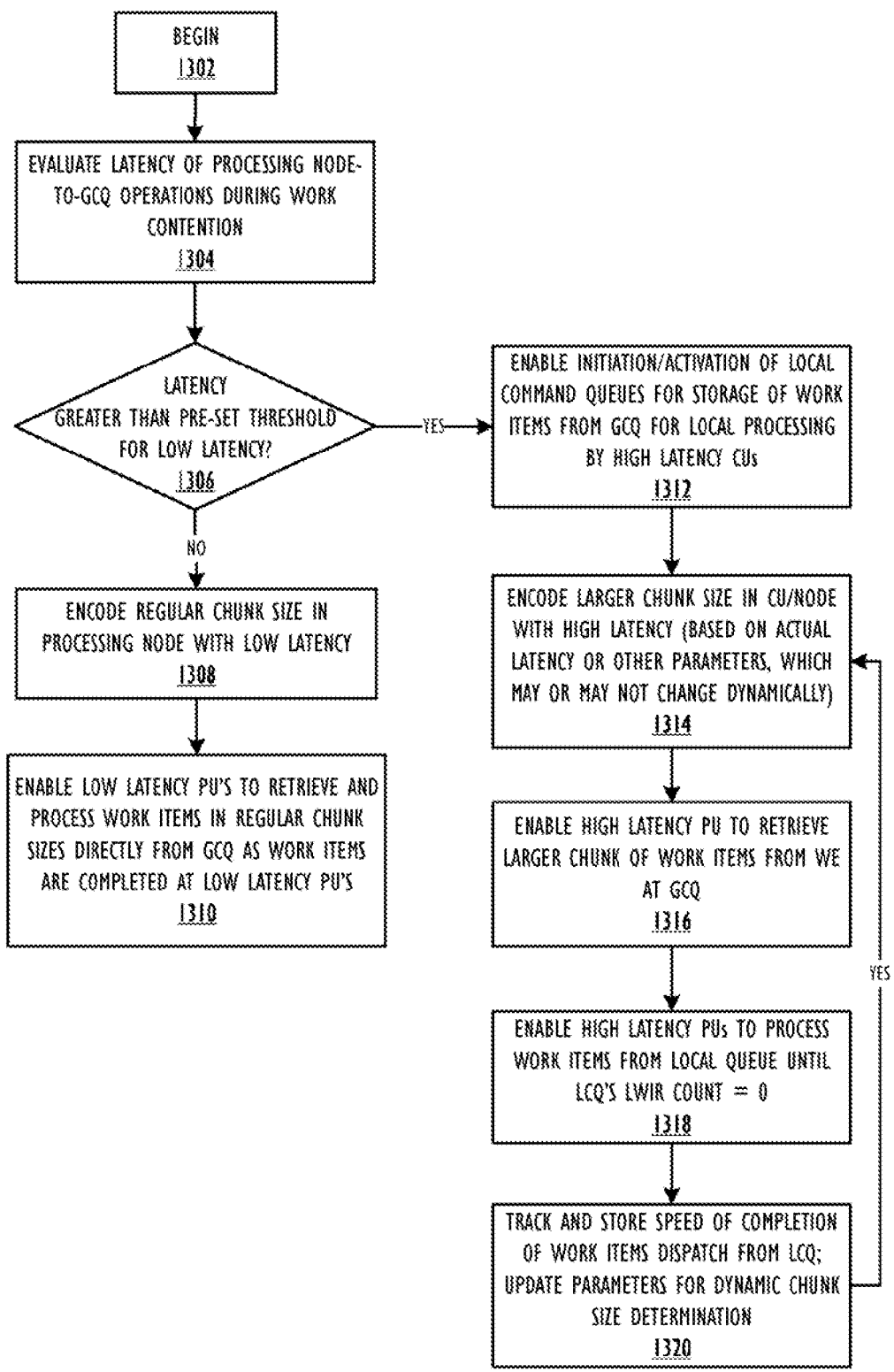
FIG. 13 is a flow chart of the method by which work is retrieved from the GCQ and executed at first processing nodes with low access latency to the GCQ and second processing nodes with high access latency to the GCQ, according to one embodiment.

Referring now to FIG. 13, there is provided a flow chart of the method by which the hybrid model of work dispatch among processing units with different access latencies to the GCQ may be implemented, according to one embodiment. The process begins at block 1302 and proceeds to block 1304 at which the local node logic (or LCQ logic) evaluates the latency of exchanges between the processor node and the GCQ during work contention and retrieval. At decision block 1306, the node logic determined is the latency is greater than a pre-establish threshold latency for low latency operations. This pre-established threshold latency may be a design value provided for the overall system or for the particular processing node and/or specifically for GCQ work dispatching operations.

If the latency is not greater than the threshold latency, then the node logic encodes the node with a regular chunk size for work request operations from the GCQ, as shown at block 1308. This encoded chunk size is then provided within each subsequently issued work request sent to the GCQ, and the low latency processing units are enabled to retrieve and process work items as regular chunks directly from the GCQ, as shown at block 1310. Returning to decision block 1306, when the latency is greater than the pre-set threshold latency for low latency operations (i.e, the processing node is a high latency processing node), the node logic initiates the establishment and/or set up of a local command queue for temporary storage of work items retrieved from the GCQ, as provided at block 1312. The localized determination of the latency to the GCQ may be based on pre-determined and/or pre-stored latency values to different locations within the overall system architecture. Thus processing node C 1010C may be pre-programmed to treat any work retrieved from a GCQ located within a different localized grouping of resources as requiring a higher latency for GCQ operations. Conversely, processing node C 1010C may also be pre-programmed to treat any work retrieved from a GCQ located within the same localized grouping of resources as having latency below the threshold latency and not requiring the establishment of a LCQ.

Returning to the flow chart, node logic of the high latency processing node encodes a larger chunk size in the processing node than for a low latency access to a GCQ, as shown at block 1314. The actual chunk size established may be based on a number of factors, as provide above, and may be dynamically changing. However, the chunk size may also be pre-set by the system designer (static allocation), in which case the LCQ may also be pre-established or may have a pre-established size (e.g., a pre-set number of entries for work storage). Once the chunk size is established/set, the node logic and/or the processing units requesting work from the GCQ encode the larger chunk size within the work requests in order to retrieve larger amounts of work to the high latency processing node, as shown at block 1316. At block 1318, the processing units within the high latency processing node then processes work items retrieved from within the LCQ until the LWIR of the LCQ reaches a zero (0) count. Notably, for embodiments in which the chunk size may be dynamically updated, the method further provides that the speed of work dispatch from the LCQ is recorded, at block 1320 and then that data is provided back to the evaluation and encoding of the larger chunk size (block 1314) for use in retrieving additional work items for the high latency processing node.

The manner in which work is retrieved by the high latency processing nodes in chunks and work completion is notified to the GCQ at the end of the local dispatch from the LCQ affects the processing by the GCQ logic in tracking work items for work elements within the GCQ. Thus, at the GCQ, when a larger chunk is requested and dispatched to the high latency processing node, GCQ logic decrements the total amount of work items remaining for dispatch once per larger chunk size, rather than each time, as required with the smaller sized (standard) chunks that may have been initially accounted for by the compiler in scheduling the work element. Also, for work dispatch occurring at the granularity of the processing units (rather than at the node level), the GCQ seen count of the work element is decremented by the total number of processing units at the high latency processing node rather than by a unitary decrement.

Returning to the sequence of FIGS. 6A-6D, and looking specifically now at FIGS. 6E-6F, there is illustrated an example process by which an approved high latency processing unit removes its chunk size of work from the GCQ, specifically WE_1. WE_1 initially has 100 work items for scheduling/dispatch and an APU masks that assumes there are 10 individual processing units in the system from seven units are approved units to which work items may be dispatched (or on which work items may be scheduled). Among the seven approved processing units are processing units 671 and 673 of high latency processing node 1010C.

As provided by FIG. 6E, the processing units that are not approved for processing WE_0 may also concurrently schedule work from a different work element at which the processing unit is approved. At FIG. 6E, a first local processing unit (e.g., processing unit 1 xxx at low latency processing node A 1010A) requests work items and receives a chunk size of 10 work items for dispatch. The WIR counter associated with WE_1 is decremented to reflect the scheduling of the 10 work items from WE_1, and the seen count is decremented by 1 (from seven (7) to six (6)). When a work request from a processing unit of high latency processing node 1010C is processed by GCQ logic, a larger chunk size of 40 work items is scheduled on and dispatched to the LCQ of the high latency processing node. GCQ logic subsequently decrements the WIR counter from 90 to 50. The seen count of WE_1 is however not decremented until the scheduled work items are dispatched from within the LCQ, as described below with reference to the method of FIG. 15.

According to one embodiment, the LCQ tracks the PU mask of the various processing units within the high latency processing node, so that the LCQ represents a combined mask that represents all of the local processing units. Once execution of the 40 work items within the LCQ is completed, i.e., the LWIR count equals or is less than zero (0), the LCQ logic issues a completion notification, which triggers the GCQ logic to decrement the seen count of WE_1 by two (2), which corresponds to the number of processing units that shared in the execution of the 40 scheduled work items on LCQ.

Once the work items are stored within LCQ, the local processing units may begin executing the work items from within LCQ. When the second processing unit of the high latency processing node initiates execution, the second processing unit looks at the LCQ to check if there is work locally stored for dispatch. Thus, rather than taking the longer latency approach to retrieve work from GCQ with the contentions involved at the GCQ, each local processing units first looks to the LCQ and takes work items from the LCQ if work is present within the LCQ. The local processing unit requests one or more work items (up to an internal/local chunk size) for execution, and the LCQ logic dispatches the next in sequence work items to local processing unit and automatically decrements the LWIR by the local chunk size of work items provided to the local processing unit. When the local processing units complete the locally stored work, the LCQ logic forwards a notification to GCQ logic to decremented the seen count. Also, if the LCQ detects that a next local processing unit issues a request for additional work, while the LWIR count is less than or equal to zero (for each locally stored portion of work elements for which the requesting processing unit is approved), the LCQ forwards the new request to the GCQ.

When the work in the LCQ is completed, a new work request will be submitted to again pull a large chunk of work from the GCQ into the LCQ. Again, work is only dispatched from a work element for which the processing units are pre-selected execution units on which to schedule work items from the work element. The work request is thus advanced to the next queue element(s) in sequence until the PU mask of the specific processing unit matches the PAU mask of the work element.

Figure 14:
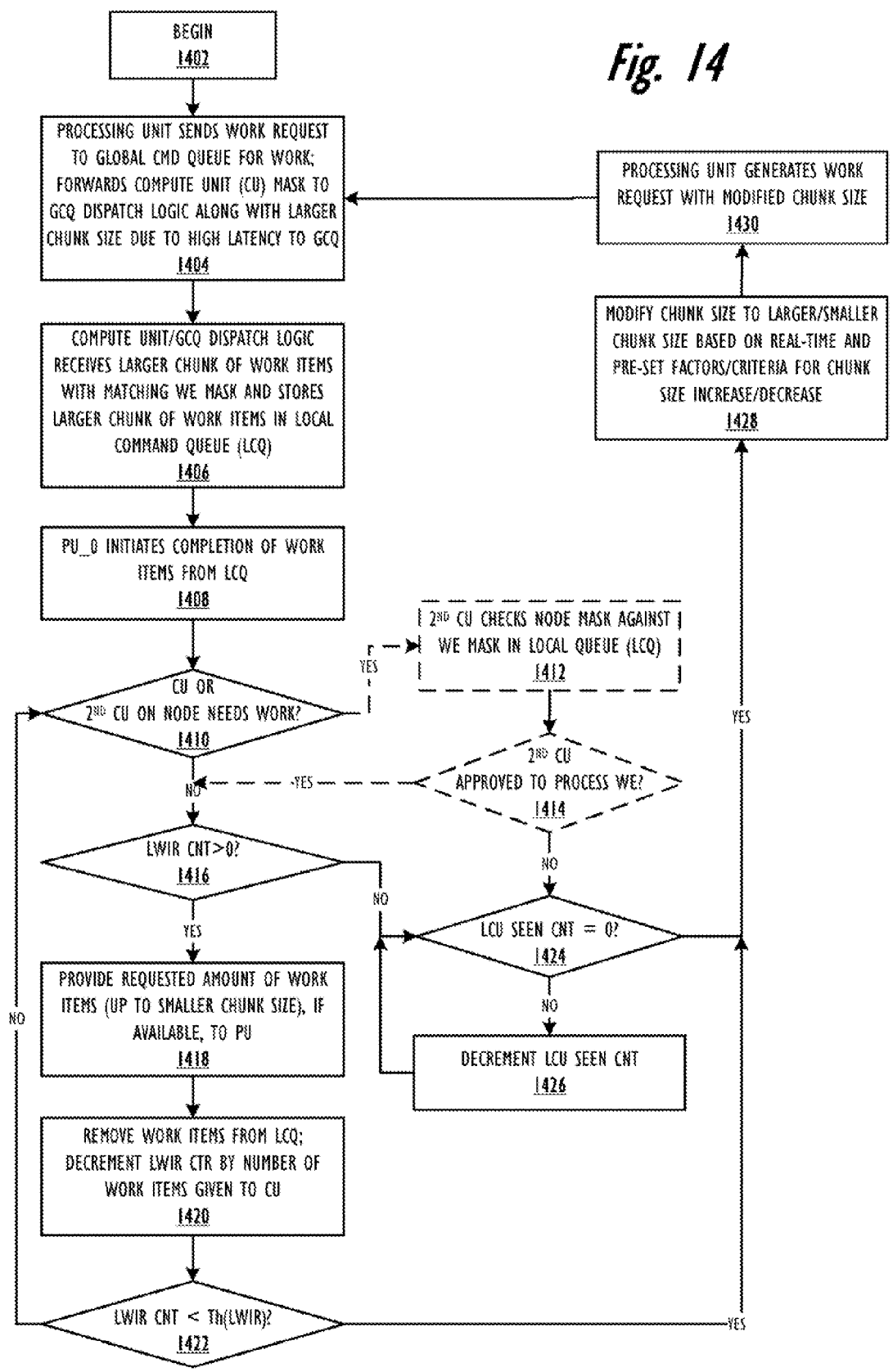
FIG. 14 is a flow chart of the method by which processor cores of the high latency processor node execute work items from the local work queue, tracks the amount of work items remaining within the local work queue, and issues requests to retrieve additional work from the GCQ for the processor node, according to one or more embodiments.

As with the GCQ tracking mechanisms described above, LCQ logic implements a local tracking mechanism to track work consumption from the LCQ by the different approved execution units at the high latency processor node. The flow chart of FIG. 14 illustrates certain features of the method by which this local tracking occurs, and the method is described from the perspective of the processing units and/or LCQ logic performing various operations. The process begins at block 1402 and proceeds to block 1404 at which a processing unit, e.g., processor core0 1171 forwards/transmits a work request to the GCQ for work. The work request includes the PU mask as well as the larger chunk size. At block 1406, the processing unit (or general work dispatch logic of the processing node) receives the larger chunk size of work from the GCQ and stores the work items in the LCQ. The first requesting processing unit initiates completion of work from the LCQ, at block 1408. A determination is made at block 1410 whether the first processing unit or another/second processing unit on the high latency processing node needs work. If one of the processing units on the high latency processing node is in need of work, and the granularity of the work assignment is at the processing unit level (versus the processing node level), the LCQ logic compares the PU mask against the APU mask (or partial APU mask) for a match at the LCQ, as shown at block 1412. At decision block 1414, LCQ logic determines whether the requesting second execution unit is approved to process work items for the current work element being executed. When the result (of the PU versus APU comparison) is a negative, the second processing unit may remain idle (or processes local work) until a later set of work items are provided within the LCQ for which the second execution unit is approved.

If, as determined at block 1414, the requesting processing node is approved at the LCQ to process work items stored within LCQ, then the LCQ logic checks at decision block 1416 whether there is any remaining work item within the LCQ (i.e., whether LWIR count is greater than zero (0)). In one embodiment, a periodic determination is made whether the LWIR count equals zero, indicating that the staged work items have all been dispatched from the LCQ. When there are still work items remaining to be executed, the LCQ logic provides the work items to the requesting processing unit, as shown at block 1418. Also, as work items are forwarded to the approved processing units at the high latency processing node, the LCQ logic decrements the LWIR counter, as shown at block 1420. The amount of work items processed by the executing unit may be a chunk size greater than one, and the decrementing of the LWIR count factors in the exact number of items that are removed from the LCQ. It is important to note that the "LWIR count=0" condition may be artificially prevented by ensuring that a next work request is forwarded to the GCQ with sufficient time (with consideration give to the latency of return of work items) to re-stock the LCQ prior to completion of execution at the high latency processing node of all of the previously-received work items stored within the LCQ. The LWIR counter may thus be decremented as provided above, but also incremented as the new batch of work items are received from a second, subsequently issued work request with updated chunk size. Thus, as provided at decision block 1422, LCQ logic determines when the LWIR count is less than a pre-established (or dynamically calculated) LWIR threshold ($TH_{LWIR}$). When the LWIR count is less than the $TH_{LWIR}$, the process proceeds to block 1428, which is described below.

Returning to decision block 1416, If the LWIR count is not greater than zero (i.e., LWIR counter holds a value that is less than or equal to zero), LCQ logic checks at block 1424 whether a local seen count is equal to zero. When the seen count is not equal to zero, LCQ logic decrements the local seen count by one, as provided at block 1426. The local seen count represents the total number of processing units within the high latency processing node. In one embodiment, the seen count is decremented as each processing unit is seen by the LCQ logic to prevent a processing unit from inadvertently retrieving new work items for a different work element without being made aware that the new work items are no longer a part of the previous set of work items processed. Thus, when the LCQ is empty, the node ensures that all processing units are made aware of the fact that the particular work set has been completed.

When the local seen count equals zero (0) or when the LWIR count is less than $TH_{LWIR}$, the LCQ logic determines whether a modification of the chunk size is required and modifies (increases or decreases) the chunk size, as required, at block 1428, The modification of the chunk size is based in part on the detected performance of the processing node dispatch of the work items within the LCQ. Then, at block 1430, a new/second work request is generated with the modified chunk size and the new/second work request is forwarded to the GCQ. Also, LCQ logic forwards a seen count update notification to the GCQ logic to update the seen count of the work element within the GCQ.

Figure 15:
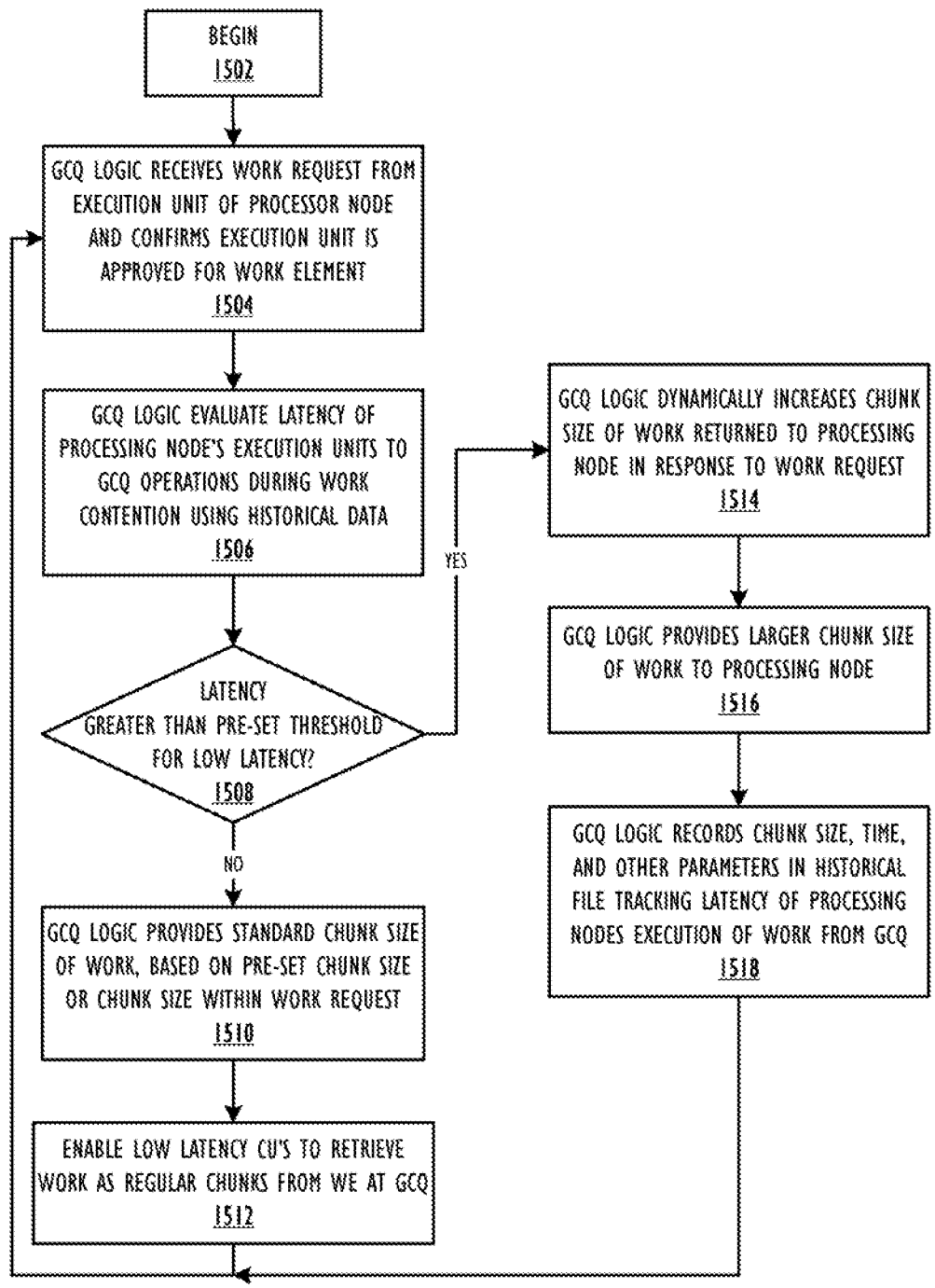
FIG. 15 is a flow chart of the method by which the GCQ logic dynamically calculates the chunk size of work to forward to a high latency processing node requesting work from a work element, according to one embodiment.

The functionality exhibited by GCQ logic enables certain of the described features to be dynamically implemented. FIG. 15 provides a flow chart of the method by which GCQ operations are performed during work dispatch to an LCQ of a high latency processing node, including determination of an appropriate chunk size and subsequent updating of work element variables as the work is completed at the high latency processing nodes. The process begins at block 1502 and proceeds to block 1504 which shows GCQ logic receiving a work request from an execution unit of a processing node and confirming the execution unit is an approved execution unit for the specific work element being dispatched and/or scheduled. At block 1506, GCQ logic evaluates the latency associated with the processing nodes operations on the system interconnect in requesting and dispatching work from the GCQ. In one embodiment, GCQ logic relies on stored historical data and retrieves the stored historical data corresponding to that processing node from the storage location. GCQ logic compares the latency of operations to a pre-set low threshold latency and determines at decision block 1508 whether processing node's latency is greater than the pre-et threshold latency. If the latency is not greater than the threshold latency, the GCQ logic provides a standard (or requested) chunk size of work in response to the work request from the processing node, as shown at block 1510. The GCQ logic then enables low latency retrieval of work by the processing node from the GCQ as regular chunks of work, as provided at block 1512. However, if at decision block 1508, the processing node's latency is greater than the threshold latency, GCQ logic dynamically increases the chunk size of work to schedule for return to the processing node in response to the work request, as provided at block 1514. GCQ logic then provides/ schedules the larger chunk size of work to the high latency processing node at block 1516. At block 1518, GCQ logic then records the chunk size scheduled, time of dispatch, and other parameters in a latency tracking history database. The database may include information for a multiple of processing nodes that access the GCQ to retrieve work for local consumption/execution.

According to one embodiment, work is scheduled as follows: (1) an execution unit checks the LCQ to see if the work element is populated within the LCQ. If there are no work items remaining within the LCQ, the execution unit next checks to see if work is being fetched by another one of the local execution units. If work is being fetched by another execution unit's issued work request to the GCQ, the execution unit waits while the work is being fetched. However, if no work request has been issued from the processing node to fetch additional/new work, the execution unit issues a work request to trigger fetching of additional work from the GCQ. When there is work in the LCQ and that work is assigned to the requesting execution unit, the WIR counter within the LCQ is decremented by the work size grabbed by the requesting execution unit. When the WIR counter is still positive after the decrement, each remaining work item will continue to be scheduled/dispatched sequentially.

In one embodiment, the process of fetching work involves the following methods: the execution unit atomically sets a bit within the LCQ or generally within the processing node to signal that work is being fetched. The CGQ logic decrements the remaining work items of the work element in the GCQ by the amount/size of the allocated work. The chunk size assigned to the LCQ is larger than the work size of the execution unit, thus ensuring that more than one execution cycle is provided within the amount of work assigned to the LCQ. If the work items remaining counter in the GCQ is still positive after the decrement, the local work items remaining (LWIR) count in the LCQ is incremented by the chunk size. Otherwise, if the WIR count at the GCQ is negative, the seen count is decremented by 1 (for a node level APU mask implementation) and by the number of local processing units at the high latency processing node (for a processing unit level APU mask implementation).

According to a first embodiment, the local seen count is decremented from the total number of local processing units within the high latency processor node to zero (0). In an alternate, second embodiment, the local seen count is incremented from zero (0) to the total number of local processing units. The former/first embodiment provides that the GCQ logic decrements the seen count at the GCQ by the predetermined total number of processing units when the LCQ logic forwards a signal indicating that all local units have seen the particular work element. With the later, second embodiment, when the local seen count is equal to the number of execution units in the high latency processing node, the work element's seen count within the GCQ is decremented by the associate local seen count. When the work element's seen count within the GCQ reaches zero (0), i.e., the pre-set number of (approved) cores in the entire system have seen the work element once, the GCQ entry holding the work element is tagged as being free for use. The scheduler may then schedule a next work element in the GCQ entry.

The described embodiments enables OpenCL execution of ND Range work elements, in which each node is capable of completing work without updating the other nodes. To provide an ND Range across scheduling LCQ's on multiple processing nodes that are "far" apart (i.e., nodes with high cross synchronization access latencies), the process simplifies to tracking the "head element" that contains the global queue count. Then, instead of only marking the element as complete, the described embodiments provide for making an additional check to see if there is a "head element".

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As provided herein, the embodiments describe a method, computer system, and computer program product for efficient dispatch/completion of a work element within a data processing system having at least one processing node among multiple processing nodes that exhibits high access latency to the GCQ. The method implementation comprises: at the at least one high latency processor node, processor logic establishing a local command/work queue (LCQ) in which multiple work items for execution by local processing units can be staged prior to execution; a first local processing unit generating a work request for retrieval of work from the GCQ; retrieving via the work request a larger chunk size of work than can be completed in a normal work completion/execution cycle by the local processing unit, wherein the larger chunk size is larger than a standard chunk size that is retrieved when the processing node is a low latency processing node; storing the larger chunk size of work retrieved in a local command/work queue (LCQ); enabling the first local processing unit to locally schedule and complete portions of the work stored within the LCQ; and generating a next work request and transmitting the next work request to the GCQ only when all the work within the LCQ has been dispatched by at least the first local processing unit.

The embodiments of the method also comprises: detecting a request for work issued from other local processing units within the high latency processor node; and dispatching to other local processing units within the high latency processing node other portions of the work stored within the LCQ;

wherein the multiple work requests issued from local processing units within the high latency processing node are handled by dispatching portions of the larger chunk size of work from within the LCQ.

Additionally, the method comprises: determining, in real time, a consumption speed at which the high latency processing node consumes and completes the larger chunk size of work retrieved from the GCQ; and dynamically modifying a local chunk size based on one or more factors, including the consumption speed. The dynamically modifying a local chunk size based on one or more factors, including the consumption speed comprises: when the consumption speed indicates one or more local processing units will become idle during a request cycle, increasing the local chunk size to request a larger chunk size within a next work request issued from the high latency processing node, wherein a periodicity of issuing work requests from the high latency processing node to the GCQ is reduced by increasing the local chunk size to accommodate the consumption speed of the local processing units; and reducing the local chunk size when the consumption speed indicates that the local processing units are not dispatching the larger chunk size timely, relative to the dispatching of similar amounts of work at other processing nodes.

In one embodiment, the larger chunk size is one of: (a) a locally computed chunk size desired by the high latency processor node and encoded within the work request issued to the GCQ from the high latency processor node; and (b) a GCQ logic determined chunk size calculated by GCQ logic based on one or more factors, including a historical latency of access by the high latency processing node to the GCQ. The GCQ logic determined chunk size is calculated by the GCQ logic completing the functions of: dynamically identifying the work request as originating from a high latency processor node; tracking a historical time of return for additional work by one or more work requests received from the high latency processor node; and when the historical time is less than a threshold amount of time and there are a large number of work items remaining for dispatch: automatically incrementing the chunk size by a calculated percentage increase of the last requested chunk size from the high latency processor node; and providing a larger amount of work equal to the calculated increase of the chunk size in response to the work request.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An article of manufacture having a computer-readable storage device and program instructions stored on the computer-readable storage device that, when executed within a data processing system having multiple nodes that access a global command queue (GCQ) for work, of which at least one node is a high-latency processing node, implements a plurality of functions comprising:

establishing a local command/work queue (LCQ) in which multiple work items for execution by local processing units are staged prior to execution;

a first local processing unit generating a work request for retrieval of work from the GCQ;

retrieving via the work request a larger chunk size of work than can be completed in a normal work completion/execution cycle by the local processing unit, wherein the larger chunk size is larger than a standard chunk size that is retrieved when the processing node is a low latency processing node;

storing the larger chunk size of work retrieved in a local command/work queue (LCQ);

enabling the first local processing unit to locally schedule and complete portions of the work stored within the LCQ;

generating a next work request for transmitting to the GCQ only when all the work within the LCQ has been dispatched by at least the first local processing unit;

determining, in real time, a consumption speed at which the high-latency processing node consumes and completes the larger chunk size of work retrieved from the GCQ; and dynamically modifying a local chunk size based on one or more factors, including the consumption speed, wherein said dynamically modifying the local chunk size includes:

in response to the consumption speed indicating one or more local processing units will become idle during a request cycle, increasing the local chunk size to request a larger chunk size within a next work request issued from the high-latency processing node, wherein a periodicity of issuing work requests from the high-latency processing node to the GCQ is reduced by increasing the local chunk size to accommodate the consumption speed of the local processing units; and reducing the local chunk size when the consumption speed indicates that the local processing units are not dispatching the larger chunk size timely, relative to the dispatching of similar amounts of work at other processing nodes.

2. The article of manufacture of claim 1, wherein the method further comprises:

detecting a request for work issued from other local processing units within the high-latency processor node; and dispatching to other local processing units within the high-latency processing node other portions of the work stored within the LCQ;

wherein the multiple work requests issued from local processing units within the high-latency processing node are handled by dispatching portions of the larger chunk size of work from within the LCQ.

3. The article of manufacture of claim 1, wherein:

each processing node has an associated processor node bit mask (PU mask) that is unique to the processor node and all processing units operating within a single processing node shares the same PU mask and are able to request and receive work items for scheduling at the processor node;

the data processing system comprises one or more application execution nodes at which the work is generated, said functions further comprising:

activating a runtime scheduler at the application execution nodes to perform the functions of:
    selectively allocating the work to specific processor nodes from among the multiple processor nodes to complete execution of a work element that has multiple individual work items that may be independently executed by different ones of the processing units at the multiple processor nodes;
    generating an allocated processor unit (APU) bit mask that identifies at least one of the processing nodes or processing units that has been selected;
    placing the work element in a first entry of a global command queue (GCQ); and
    associating the APU mask with the work element in the first entry of the GCQ; and triggering GCQ logic, responsive to receipt at the GCQ of a work request from the high-latency processor node to perform the functions of:
    determining that the high-latency processor node is an approved processor node scheduling work items from the work element; and
    dispatching work items from the work element in the GCQ to the high-latency processor node only when the high-latency processor node is an approved processing node;
    wherein said dispatching work items from the work element in the GCQ to the high-latency processing node only when the high-latency processing node is an approved processing node, further comprises:
        comparing a processing unit (PU) mask of the high-latency processor node with the APU mask;
        wherein the comparing of the PU mask with the APU mask involves performing a logical AND of the PU masks and the APU mask, which logical AND yields a first positive result when the PU mask corresponds to the allocated specific processor node and a second negative result when the PU mask does not correspond to one of the allocated specific processor nodes;
        in response to a comparison of the PU mask with the APU mask generating a first result, which first result indicates that the processor node is an approved processing node for the work element, providing the larger chunk size of the multiple individual work items to the high-latency processor node in response to the work request; and
        in response to a comparison of the PU mask with the APU mask generating a second result, which second result indicates that the processor node is not a pre-selected execution unit for the work element, forwarding the work request to a next entry of the GCQ holding a next work element with a next APU mask.

4. The article of manufacture of claim 1, wherein the larger chunk size is one of:

(a) a locally computed chunk size desired by the high-latency processor node and encoded within the work request issued to the GCQ from the high-latency processor node; and (b) a GCQ logic determined chunk size calculated by GCQ logic based on one or more factors, including a historical latency of access by the high-latency processing node to the GCQ;

wherein the GCQ logic determined chunk size is calculated by the GCQ logic completing the functions of:
    dynamically identifying the work request as originating from a high-latency processor node;
    tracking a historical time of return for additional work by one or more work requests received from the high-latency processor node; and
    in response to the historical time being less than a threshold amount of time and there being a large number of work items remaining for dispatch:
    automatically incrementing the chunk size by a calculated percentage increase of the last requested chunk size from the high-latency processor node; and
    providing a larger amount of work equal to the calculated increase of the chunk size in response to the work request.

5. The article of manufacture of claim 1, said functions further comprising:

providing, within a local work items remaining (LWIR) counter associated with the work in the LCQ, an initial LWIR counter value corresponding to a number of individual work items of the work element that is placed within the LCQ;

in response to work items being dispatched from the LCQ to the local processing units within the high-latency processing node or node, dynamically decrementing a current LWIR counter value of the LWIR counter by an amount equal to the number of work items dispatched to the requesting local processing unit;

providing, within a seen counter associated with the work within the LCQ, an initial seen counter value corresponding to a total number of the local processing units, and which tracks when each of the local processing unit attempts to retrieve work from the LCQ;

monitoring the LWIR counter to determine when the current LWIR counter value is equal to or less than zero (0);

in response to the current LWIR counter value being equal to or less than zero (0), and subsequently receiving a work request from one of local processing units, automatically decrementing a current seen counter value by one (1);

detecting when the current seen counter value in the LCQ is equal to zero (0); and in response to the current seen counter in the LCQ being equal to zero, automatically issuing a seen counter update to the GCQ indicating that a total number of local processing units have seen the work element;

wherein the GCQ logic, responsive to receiving the send counter update, performs an update of a seen counter within the GCQ by decrementing the GCQ seen counter by the total number of local processing units.

6. A data processing system comprising:

a global command queue (GCQ) that holds work elements that are processed via multiple processing units across multiple processor nodes, wherein the GCQ is accessible via work requests generated by one or more execution units;
a plurality of processing nodes coupled via a system interconnect fabric to a system memory holding the GCQ, each processing node having one or more of the execution units, and wherein at least a first processing node exhibits a high access latency to the GCQ;
work scheduling logic at the first processor node that configures the data processing system to:
establish a local command/work queue (LCQ) in which multiple work items for execution by local processing units are staged prior to execution;
cause a first local processing unit to generate a work request for retrieval of work from the GCQ;
retrieve, via the work request, a larger chunk size of work than can be completed in a normal work completion/execution cycle by the local processing unit, wherein the larger chunk size is larger than a standard chunk size that is retrieved when the processing node is a low latency processing node;
store the larger chunk size of work retrieved in a local command/work queue (LCQ);
enable the first local processing unit to locally schedule and complete portions of the work stored within the LCQ; and
generate a next work request for transmitting to the GCQ only when all the work within the LCQ has been dispatched by at least the first local processing unit;
determine, in real time, a consumption speed at which the high-latency processing node consumes and completes the larger chunk size of work retrieved from the GCQ; and
dynamically modify a local chunk size based on one or more factors, including the consumption speed, wherein said dynamically modifying the local chunk size includes:
in response to the consumption speed indicating one or more local processing units will become idle during a request cycle, increase the local chunk size to request a larger chunk size within a next work request issued from the high-latency processing node, wherein a periodicity of issuing work requests from the high-latency processing node to the GCQ is reduced by increasing the local chunk size to accommodate the consumption speed of the local processing units; and
reduce the local chunk size when the consumption speed indicates that the local processing units are not dispatching the larger chunk size timely, relative to the dispatching of similar amounts of work at other processing nodes.

7. The data processing system of claim 6, the work scheduling logic further comprising logic that:
detects a request for work issued from other local processing units within the high-latency processor node; and
dispatches to other local processing units within the high-latency processing node other portions of the work stored within the LCQ;
wherein the multiple work requests issued from local processing units within the high-latency processor node are handled by dispatching portions of the larger chunk size of work from within the LCQ.

8. The data processing system of claim 6, wherein:
each processing node has an associated processor node bit mask (PU mask) that is unique to the processor node and all processing units operating within a single processing node shares the same PU mask and are able to request and receive work items for scheduling at the processor node;
the data processing system comprises one or more application execution nodes at which the work is generated, said data processing system further comprising:
a runtime scheduler at the application execution nodes that:
selectively allocates the work to specific processor nodes from among the multiple processor nodes to complete execution of a work element that has multiple individual work items that may be independently executed by different ones of the processing units at the multiple processor nodes;
generates an allocated processor unit (APU) bit mask that identifies at least one of the processing nodes or processing units that has been selected;
places the work element in a first entry of a global command queue (GCQ); and
associates the APU mask with the work element in the first entry of the GCQ; and
GCQ logic, responsive to receipt at the GCQ of a work request from the high-latency processor node that:
determines that the high-latency processor node is an approved processor node scheduling work items from the work element; and
dispatches work items from the work element in the GCQ to the high-latency processor node only when the high-latency processor node is an approved processing node.

9. The data processing system of claim 8, wherein said GCQ logic that dispatches work items from the work element in the GCQ to the high-latency processing node only when the high-latency processing node is an approved processing node, further comprises logic that:
compares a processing unit (PU) mask of the high-latency processor node with the APU mask;
in response to a comparison of the PU mask with the APU mask generating a first result, which first result indicates that the processor node is an approved processing node for the work element, providing the larger chunk size of the multiple individual work items to the high-latency processor node in response to the work request; and
in response to a comparison of the PU mask with the APU mask generating a second result, which second result indicates that the processor node is not a pre-selected execution unit for the work element, forwarding the work request to a next entry of the GCQ holding a next work element with a next APU mask.

10. The data processing system of claim 9, wherein the comparing of the PU mask with the APU mask involves performing a logical AND of the PU masks and the APU mask, which logical AND yields a first positive result when the PU mask corresponds to the allocated specific processor node and a second negative result when the PU mask does not correspond to one of the allocated specific processor nodes.

11. The data processing system of claim 6, wherein the larger chunk size is one of:
(a) a locally computed chunk size desired by the high-latency processor node and encoded within the work request issued to the GCQ from the high-latency processor node; and
(b) a GCQ logic determined chunk size calculated by GCQ logic based on one or more factors, including a historical latency of access by the high-latency processing node to the GCQ.

12. The data processing system of claim 11 the GCQ logic determined chunk size is calculated by the GCQ logic that:

dynamically identifies the work request as originating from a high-latency processor node;

tracks a historical time of return for additional work by one or more work requests received from the high-latency processor node; and in response to the historical time being less than a threshold amount of time and there are a large number of work items remaining for dispatch:

automatically increments the chunk size by a calculated percentage increase of the last requested chunk size from the high-latency processor node; and provides a larger amount of work equal to the calculated increase of the chunk size in response to the work request.

13. The data processing system of claim 6, said work scheduling logic further comprising logic that:

provides, within a local work items remaining (LWIR) counter associated with the work in the LCQ, an initial LWIR counter value corresponding to a number of individual work items of the work element that is placed within the LCQ;

in response to work items being dispatched from the LCQ to the local processing units within the high-latency processing node or node, dynamically decrements a current LWIR counter value of the LWIR counter by an amount equal to the number of work items dispatched to the requesting local processing unit;

provides, within a seen counter associated with the work within the LCQ, an initial seen counter value corresponding to a total number of the local processing units, and which tracks when each of the local processing unit attempts to retrieve work from the LCQ;

monitors the LWIR counter to determine when the current LWIR counter value is equal to or less than zero (0);

in response to the current LWIR counter value being equal to or less than zero (0), and subsequently receiving a work request from one of local processing units, automatically decrements a current seen counter value by one (1);

detects when the current seen counter value in the LCQ is equal to zero (0); and in response to the current seen counter in the LCQ being equal to zero, automatically issue a seen counter update to the GCQ indicating that a total number of local processing units have seen the work element;

wherein the GCQ logic, responsive to receiving the send counter update, performs an update of a seen counter within the GCQ by decrementing the GCQ seen counter by the total number of local processing units.

* * * * *